United States Patent
Wang

(10) Patent No.: US 11,997,729 B2
(45) Date of Patent: May 28, 2024

(54) PDU SESSION ACTIVATION METHOD AND APPARATUS, AND PAGING METHOD AND APPARATUS

(71) Applicant: DATANG MOBILE COMMUNICATIONS EQUIPMENT CO., LTD., Beijing (CN)

(72) Inventor: Hucheng Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 419 days.

(21) Appl. No.: 17/423,102

(22) PCT Filed: Dec. 25, 2019

(86) PCT No.: PCT/CN2019/128465
§ 371 (c)(1),
(2) Date: Jul. 14, 2021

(87) PCT Pub. No.: WO2020/147543
PCT Pub. Date: Jul. 23, 2020

(65) Prior Publication Data
US 2022/0132602 A1 Apr. 28, 2022

(30) Foreign Application Priority Data

Jan. 15, 2019 (CN) .......... 201910036964.4
Jan. 23, 2019 (CN) .......... 201910065341.X

(51) Int. Cl.
*H04W 76/11* (2018.01)
*H04W 68/02* (2009.01)

(52) U.S. Cl.
CPC .......... *H04W 76/11* (2018.02); *H04W 68/02* (2013.01)

(58) Field of Classification Search
CPC ..... H04W 76/11; H04W 68/02; H04W 68/00; H04W 76/15; H04W 76/10; H04W 68/005

(Continued)

(56) References Cited

U.S. PATENT DOCUMENTS 10,757,611 B2 * 8/2020 Qiao .......... H04W 36/32
11,576,043 B2 * 2/2023 Kim .......... H04W 76/10
(Continued)

FOREIGN PATENT DOCUMENTS

CA 3026841 A1 * 6/2019 .......... H04W 24/02
CN 108370600 A 8/2018
(Continued)

OTHER PUBLICATIONS

3GPP TR 23.716 V1.1.0, 3rd Generation Partnership Project; Technical Specification Group Services and System Aspects;Study on the Wireless and Wireline Convergence for the 5G system architecture (Release 16), total 162 pages, Oct. 2018.
(Continued)

*Primary Examiner* — Mahendra R Patel
(74) *Attorney, Agent, or Firm* — Kilpatrick Townsend & Stockton LLP

(57) ABSTRACT

Disclosed are a PDU session activation method and apparatus, and a paging method and apparatus. In the PDU session activation method, after receiving a downlink data arrival notification message, an SMF entity determines that a PDU session for transmitting downlink data is a multi-access PDU session, and then determines at least one access and mobility management function (AMF) entity corresponding to the multi-access PDU session; and the SMF entity sends a session activation trigger message to the at least one AMF entity, and the session activation trigger message carries at least the session identifier of the multi-
(Continued)

access PDU session, and the session activation trigger message enables the at least one AMF entity to activate any or specified one of at least two user plane connections corresponding to the multi-access PDU session according to the multi-access PDU session corresponding to the session identifier.

16 Claims, 9 Drawing Sheets

(58) Field of Classification Search
USPC .................................................. 370/328
See application file for complete search history.

(56) References Cited

U.S. PATENT DOCUMENTS

| | | | | |
|---|---|---|---|---|
| 11,723,100 | B2* | 8/2023 | Kawasaki | H04W 76/18 370/329 |
| 11,778,693 | B2* | 10/2023 | Kahn | H04W 36/12 370/331 |
| 2018/0199398 | A1* | 7/2018 | Dao | H04L 67/14 |
| 2018/0227873 | A1* | 8/2018 | Vrzic | H04W 28/26 |
| 2018/0270782 | A1* | 9/2018 | Park | H04W 60/06 |
| 2019/0007500 | A1* | 1/2019 | Kim | H04L 67/141 |
| 2019/0124561 | A1* | 4/2019 | Faccin | H04W 36/0022 |
| 2019/0159082 | A1* | 5/2019 | Talebi Fard | H04W 8/08 |
| 2019/0215724 | A1* | 7/2019 | Talebi Fard | H04W 48/16 |
| 2020/0053816 | A1* | 2/2020 | Son | H04W 76/30 |
| 2020/0170055 | A1* | 5/2020 | Dou | H04W 36/14 |
| 2021/0211960 | A1* | 7/2021 | Ryu | H04W 36/0011 |

FOREIGN PATENT DOCUMENTS

| | | | | |
|---|---|---|---|---|
| CN | 108702722 A | | 10/2018 | |
| CN | 108811009 A | * | 11/2018 | ........ H04W 36/0011 |
| CN | 108811009 A | | 11/2018 | |
| CN | 110831092 A | * | 2/2020 | ........ H04W 36/0033 |
| CN | 111107664 A | * | 5/2020 | ............ H04W 12/06 |
| CN | 111436161 A | * | 7/2020 | ............ H04W 76/11 |
| EP | 3678448 A1 | | 7/2020 | |
| WO | WO-2012050841 A1 | * | 4/2012 | ........ H04L 61/2007 |
| WO | WO-2018034337 A1 | * | 2/2018 | ........... H04L 5/0098 |
| WO | 2018174509 A1 | | 9/2018 | |
| WO | WO-2018170703 A1 | * | 9/2018 | |
| WO | WO-2018174509 A1 | * | 9/2018 | ............ H04W 60/06 |
| WO | WO-2019011398 A1 | * | 1/2019 | ............ H04L 45/302 |
| WO | WO-2019020117 A1 | * | 1/2019 | ............ H04W 36/00 |
| WO | WO-2020087421 A1 | * | 5/2020 | ............ H04L 67/14 |

OTHER PUBLICATIONS

Nokia et al., "Paging via 3GPP access for a non-3GPP POU session", 3GPP TSG-CT WG1 Meeting #105, Krakow (Poland), Aug. 21-25, 2017, total 8 pages, C1-173364.

ZTE, "Update of Solution 39: UE availability after DON failure for multiple AFs", SA WG2 Meeting #129, 14-20 2018, Dongguan, China, total 9 pages, S2-1811458(revision of S2-1810323).

Nokia et al., "Paging via 3GPP access for a non-3GPP PDU session", 3GPP TSG-CT WG1 Meeting #105, Krakow (Poland), Aug. 21-25, 2017, total 8 pages, C1-172963.

* cited by examiner

PDU SESSION ACTIVATION METHOD AND APPARATUS, AND PAGING METHOD AND APPARATUS

The present application is a National Stage of International Application No. PCT/CN2019/128465, filed Dec. 25, 2019, which claims priorities to the Chinese Patent Application No. 201910036964.4 filed on Jan. 15, 2019 with the Chinese Patent Office and entitled "PDU SESSION ACTIVATION METHOD AND APPARATUS, AND PAGING METHOD AND APPARATUS", and the Chinese Patent Application No. 201910065341.X filed on Jan. 23, 2019 with the Chinese Patent Office and entitled "PDU SESSION ACTIVATION METHOD AND APPARATUS, AND PAGING METHOD AND APPARATUS", the entire contents of which are incorporated herein by reference.

FIELD

The present application relates to the field of communications, and in particular, to a protocol data unit (PDU) session activation method, a paging method, and an apparatus.

BACKGROUND

In a 5G system supporting satellite access, it is supported that multiple PDU sessions can be created between a user equipment (UE, also called a terminal) and a network in order to guarantee reliability of data transmission. For convenience of description, these PDU sessions are referred to as mutually associated sub PDU sessions.

When downlink data arrives in the mutually associated sub PDU sessions, if user plane connections of all sub PDU sessions in the mutually associated sub PDU sessions are not established, a session management function (SMF) entity needs to trigger an access and mobility management function (AMF) entity to page the UE and activate the sub PDU sessions.

At present, there is no solution for this demand.

SUMMARY

The embodiments of the application provide a PDU session activation method, a paging method and an apparatus.

In a first aspect, provided is a PDU session activation method, and the method includes: receiving, by an SMF entity, a downlink data arrival notification message; determining, by the SMF entity, that a sub PDU session used for transmitting the downlink data has mutually associated sub PDU sessions, and then determining at least one AMF entity corresponding to the mutually associated sub PDU sessions; and sending, by the SMF entity, a message configured to activate the sub PDU session to the at least one AMF entity, where the message configured to activate the sub PDU session carries at least session identifiers of the mutually associated sub PDU sessions, and the message configured to activate the sub PDU session enables the AMF entity to activate any or specified one of the mutually associated sub PDU sessions corresponding to the session identifiers.

In a possible implementation, sending, by the SMF entity, the message configured to activate the sub PDU session to the at least one AMF entity, where the message configured to activate the sub PDU session carries at least the session identifiers of the mutually associated sub PDU sessions, includes: determining, by the SMF entity, to activate any one of the mutually associated sub PDU sessions, and then for each of the mutually associated sub PDU sessions, sending a message configured to activate the sub PDU session to the at least one AMF entity, where each message configured to activate the sub PDU session carries session identifiers of the mutually associated sub PDU sessions, association indication information, and radio access type indication information corresponding to the targeted PDU session, and the association indication information indicates activation of any one of the mutually associated sub PDU sessions.

In one embodiment, for each of the mutually associated sub PDU sessions, sending, by the SMF entity, the message configured to activate the sub PDU session to the at least one AMF entity, includes: determining, by the SMF entity, that the mutually associated sub PDU sessions correspond to a same AMF entity, and then sending the message configured to activate the sub PDU session to the same AMF entity respectively; or, determining, by the SMF entity, that the mutually associated sub PDU sessions correspond to different AMF entities, and then sending the message configured to activate the sub PDU session to the different AMF entities respectively.

In a possible implementation, sending, by the SMF entity, the message configured to activate the sub PDU session to the at least one AMF entity, where the message configured to activate the sub PDU session carries at least the session identifiers of the mutually associated sub PDU sessions, includes: determining, by the SMF entity, that the mutually associated sub PDU sessions correspond to a same AMF entity, and determining to activate any one of the mutually associated sub PDU sessions, and then sending a message configured to activate the sub PDU session to the same AMF entity, where the message configured to activate the sub PDU session carries the session identifiers of the mutually associated sub PDU sessions.

In a possible implementation, sending, by the SMF entity, the message configured to activate the sub PDU session to the at least one AMF entity, where the message configured to activate the sub PDU session carries at least the session identifiers of the mutually associated sub PDU sessions, includes: determining, by the SMF entity, that the mutually associated sub PDU sessions correspond to a same AMF entity, and determining to activate a specified sub PDU session of the mutually associated sub PDU sessions, and then sending the message configured to activate the sub PDU session to the same AMF entity, where the message configured to activate the sub PDU session carries the session identifiers of the mutually associated sub PDU sessions and radio access type information corresponding to the specified PDU session; or, determining, by the SMF entity, that the mutually associated sub PDU sessions correspond to different AMF entities, and determining to activate the specified sub PDU session of the mutually associated sub PDU sessions, and then determining the AMF entity corresponding to the specified PDU session, and sending the message configured to activate the sub PDU session to the AMF entity corresponding to the specified PDU session, where the message configured to activate the sub PDU session carries the session identifiers of the mutually associated sub PDU sessions.

In a possible implementation, the message configured to activate the sub PDU session further carries uplink tunnel information of the targeted sub PDU session.

In a possible implementation, the method further includes: receiving, by the SMF entity, a session update request message sent by the at least one AMF entity, where the session update request message carries radio access type information; and activating, by the SMF entity, a user plane connection of the sub PDU sessions according to the session update request message, so that downlink data is transmitted through the sub PDU sessions.

In a second aspect, provided is a PDU session activation method, and the method includes: receiving, by an AMF entity, a message configured to activate the sub PDU session from an SMF entity, where the message configured to activate the sub PDU session carries at least session identifiers of mutually associated sub PDU sessions, and activating, by the AMF entity, according to the message configured to activate the sub PDU session, any or specified one of the mutually associated sub PDU sessions.

In a possible implementation, the message configured to activate the sub PDU session further carries association indication information and access type indication information, and the association indication information indicates activation of any one of the mutually associated sub PDU sessions.

Activating, by the AMF entity, according to the message configured to activate the sub PDU session, any one of the mutually associated sub PDU sessions includes: determining, by the AMF entity, that a terminal corresponding to the mutually associated sub PDU sessions is in a connected state in a radio access network corresponding to the access type indication information, and then activating a sub PDU session corresponding to the PDU session identifier in the radio access network corresponding to the access type indication information.

In one embodiment, the message configured to activate the sub PDU session further carries association indication information and access type indication information, and the association indication information indicates activation of any one of the mutually associated sub PDU sessions; the AMF entity determines that the terminal corresponding to the mutually associated sub PDU sessions is in an idle state in all radio access networks corresponding to mutually associated PDUs, and then sends a paging request message to an RAN node in the radio access network corresponding to the access type indication information, where the paging request message carries the association indication information or an association sequence number generated by the AMF. The association sequence number generated by the AMF may be generated by the AMF based on the association indication information, or may be independently generated by the AMF itself.

In one embodiment, the method further includes: determining, by the AMF entity, whether to page the terminal in all the radio access networks; when determining to page the terminal in all the radio access networks, after receiving the message configured to activate the sub PDU session from the SMF entity, immediately sending the paging request message; or when determining not to page the terminal in all the radio access networks, determining whether the received message configured to activate the sub PDU session is a first message configured to activate the sub PDU session carrying a same PDU session identifier, when determining that the received message configured to activate the sub PDU session is the first message configured to activate the sub PDU session carrying the same PDU session identifier, immediately sending the paging request message, or when determining that the received message configured to activate the sub PDU session is not the first message configured to activate the sub PDU session carrying the same PDU session identifier, after waiting for failure of paging the terminal in other radio access networks, sending the paging request message to an RAN node in a radio access network corresponding to the access type indication information.

In a possible implementation, activating, by the AMF entity, according to the message configured to activate the sub PDU session, any or specified one of the mutually associated sub PDU sessions includes: determining, by the AMF entity, that the terminal corresponding to the mutually associated sub PDU sessions is in a connected state in a first radio access network, and then activating a sub PDU session corresponding to the PDU session identifier in the first radio access network, where the first radio access network is any one of multiple radio access networks corresponding to the mutually associated sub PDU sessions.

In a possible implementation, activating, by the AMF entity, according to the message configured to activate the sub PDU session, any or specified one of the mutually associated sub PDU sessions includes: determining, by the AMF entity, that the terminal corresponding to the mutually associated sub PDU sessions is in an idle state in all radio access networks corresponding to the mutually associated PDUs, and then determining whether to page the terminal in all the radio access networks; when determining to page the terminal in all the radio access networks, respectively sending paging request messages to RAN nodes in all the radio access networks corresponding to the mutually associated sub PDU sessions; or when determining not to page the terminal in all the radio access networks, determining whether the received message configured to activate the sub PDU session is a first message configured to activate the sub PDU session carrying a same PDU session identifier, when determining that the received message configured to activate the sub PDU session is the first message configured to activate the sub PDU session carrying the same PDU session identifier, sending the paging request message to the RAN node in the first radio access network, or when determining that the received message configured to activate the sub PDU session is not the first message configured to activate the sub PDU session carrying the same PDU session identifier, after waiting for failure of paging the terminal in the radio access network where the RAN node in the first radio access network is located, sending the paging request message to an RAN node in a second radio access network, where the RAN node in the first radio access network and the RAN node in the second radio access network are different RAN nodes among the RAN nodes in the radio access networks corresponding to the mutually associated sub PDU sessions.

In a possible implementation, the radio access networks corresponding to the mutually associated sub PDU sessions include a first radio access network and a second radio access network, the message configured to activate the sub PDU session further carries access type indication information, and the access type indication information corresponds to the first radio access network.

Activating, by the AMF entity, according to the message configured to activate the sub PDU session, the specified sub PDU session of the mutually associated sub PDU sessions includes: determining, by the AMF entity, that the terminal corresponding to the mutually associated sub PDU sessions is in a connected state in the first radio access network corresponding to the access type indication information, and then activating a PDU session corresponding to the PDU session identifier in the first radio access network; or, determining, by the AMF entity, that the terminal corresponding to the mutually associated sub PDU sessions is in a connected state in the second radio access network, and then sending a notification message to the RAN node in the second access network, where the notification message is used for notifying the terminal of activating a PDU session corresponding to the PDU session identifier in the first radio access network; or, determining, by the AMF entity, that the terminal corresponding to the mutually associated sub PDU sessions is in an idle state in the second radio access network, and then sending the paging request message to the RAN node in the second radio access network, and sending a reject message to the terminal after receiving a service request message sent by the terminal, where the reject message is used for instructing the terminal to initiate a service request process in the first access network.

In a third aspect, provided is a paging method, and the method includes: receiving, by a terminal, a first paging message from a first radio access network corresponding to a first sub PDU session, where the first paging message carries association indication information or an association sequence number, and the association indication information or the association sequence number indicates that the terminal has a second paging message carrying the same association indication information or the same association sequence number; responding, by the terminal, to the first paging message and ignoring the second paging message; or, responding, by the terminal, to the second paging message and ignoring the first paging message.

In one embodiment, responding, by the terminal, to the paging message includes: sending, by the terminal, a service request message to an AMF entity; and the method further includes: receiving, by the terminal, a reject message sent by the AMF entity, where the reject message is used for instructing the terminal to initiate a service request process in a second access network corresponding to a second sub PDU session associated with the first sub PDU session; and initiating, by the terminal, the service request process through the second access network corresponding to the second sub PDU session according to the reject message.

In a fourth aspect, provided is a session management function entity apparatus, including: a receiving device for receiving a downlink data arrival notification message; a processing device for determining that a sub PDU session for transmitting downlink data has mutually associated sub PDU sessions, and then determining at least one AMF entity corresponding to the mutually associated sub PDU sessions; and a sending device for sending a message configured to activate the sub PDU session to the at least one AMF entity, where the message configured to activate the sub PDU session carries at least session identifiers of the mutually associated sub PDU sessions, and the message configured to activate the sub PDU session enables the AMF entity to activate any or specified one of the mutually associated sub PDU sessions corresponding to the session identifiers.

In a fifth aspect, provided is an access and mobility management function entity apparatus, including: a receiving device for receiving a message configured to activate the sub PDU session from an SMF entity, where the message configured to activate the sub PDU session carries at least session identifiers of mutually associated sub PDU sessions; and a processing device for activating, according to the message configured to activate the sub PDU session, any or specified one of the mutually associated sub PDU sessions.

In a sixth aspect, provided is a terminal, including: a receiving device for receiving a first paging message from a first radio access network corresponding to a first sub PDU session, where the first paging message carries association indication information or an association sequence number, and the association indication information or the association sequence number indicates that the terminal has a second paging message carrying the same association indication information or the same association sequence number; and a processing device for responding to the first paging message and ignoring the second paging message; or, responding to the second paging message and ignoring the first paging message.

In a seventh aspect, provided is a communication apparatus, including: a processor and a memory, where the processor is used for reading one or more computer instructions in the memory to execute any one method of the above first aspect.

In an eighth aspect, provided is a communication apparatus, including: a processor and a memory, where the processor is used for reading one or more computer instructions in the memory to execute any one method according of the above second aspect.

In a ninth aspect, provided is a communication apparatus, including: a processor, a memory and a transceiver, where the processor is used for reading one or more computer instructions in the memory to execute any one method of the above third aspect.

In a tenth aspect, provided is a computer-readable storage medium, where the computer-readable storage medium stores one or more computer-executable instructions, and the one or more computer-executable instructions are used for causing a computer to execute any one method of the above first aspect.

In an eleventh aspect, provided is a computer-readable storage medium, where the computer-readable storage medium stores one or more computer-executable instructions, and the one or more computer-executable instructions are used for causing a computer to execute any one method of the above second aspect.

In a twelfth aspect, provided is a computer-readable storage medium, where the computer-readable storage medium stores one or more computer-executable instructions, and the one or more computer-executable instructions are used for causing a computer to execute any one method of the above third aspect.

In a thirteenth aspect, provided is a PDU session activation method, including: receiving, by an SMF entity, a downlink data arrival notification message; determining, by the SMF entity, that a PDU session for transmitting the downlink data is a multi-access PDU session, and then determining at least one AMF entity corresponding to the multi-access PDU session; and sending, by the SMF entity, a message configured to activate the PDU session to the at least one AMF entity, where the message configured to activate the PDU session carries at least a PDU session identifier of the multi-access PDU session, and the message configured to activate the PDU session enables the at least one AMF entity to activate any or specified one of at least two user plane connections of the multi-access PDU session corresponding to the PDU session identifier.

In a fourteenth aspect, provided is a PDU session activation method, including: receiving, by an AMF entity, a message configured to activate the PDU session from an SMF entity, where the message configured to activate the PDU session carries at least a PDU session identifier of a multi-access PDU session; and activating, by the AMF entity, according to the message configured to activate the PDU session, any or specified one of at least two user plane connections of the multi-access PDU session.

In a fifteenth aspect, provided is a paging method, including: receiving, by a terminal, a first paging message from a first radio access network, where the first paging message carries association indication information or an association sequence number, and the association indication information or the association sequence number indicates that the terminal has a second paging message carrying the same association indication information or the same association sequence number; and where the first radio access network is one of at least two radio access networks corresponding to at least two user plane connections of a multi-access PDU session; responding, by the terminal, to the first paging message and ignoring the second paging message; or, responding, by the terminal, to the second paging message and ignoring the first paging message.

In a sixteenth aspect, provided is an SMF entity apparatus, including: a receiving device for receiving a downlink data arrival notification message; a processing device for determining that a PDU session for transmitting the downlink data is a multi-access PDU session, and then determining at least one AMF entity corresponding to the multi-access PDU session; and a sending device for sending a message configured to activate the PDU session to the at least one AMF entity, where the message configured to activate the PDU session carries at least a PDU session identifier of the multi-access PDU session, and the message configured to activate the PDU session enables the at least one AMF entity to activate any or specified one of at least two user plane connections of the multi-access PDU session corresponding to the PDU session identifier.

In a seventeenth aspect, provided is an AMF entity apparatus, including: a receiving device for receiving a message configured to activate the PDU session from an SMF entity, where the message configured to activate the PDU session carries at least a PDU session identifier of a multi-access PDU session; and a processing device for activating, according to the message configured to activate the PDU session, any or specified one of at least two user plane connections of the multi-access PDU session.

In an eighteenth aspect, provided is a terminal, including: a receiving device for receiving a first paging message from a first radio access network, where the first paging message carries association indication information or an association sequence number, and the association indication information or the association sequence number indicates that the terminal has a second paging message carrying the same association indication information or the same association sequence number; where the first radio access network is one of at least two radio access networks corresponding to at least two user plane connections of a multi-access PDU session; and a processing device for responding to the first paging message and ignoring the second paging message; or, the terminal responding to the second paging message and ignoring the first paging message.

In a nineteenth aspect, provided is a communication apparatus, including: a processor and a memory, where the processor is used for reading one or more computer instructions in the memory to execute any one method of the above thirteenth aspect.

In a twentieth aspect, provided is a communication apparatus, including: a processor and a memory, where the processor is used for reading one or more computer instructions in the memory to execute any one method of the above fourteenth aspect.

In a twenty-first aspect, provided is a communication apparatus, including: a processor, a memory and a transceiver, where the processor is used for reading one or more computer instructions in the memory to execute any one method of the above fifteenth aspect.

In a twenty-second aspect, provided is a computer-readable storage medium, where the computer-readable storage medium stores one or more computer-executable instructions, and the one or more computer-executable instructions are used for causing a computer to execute any one method of the thirteenth aspect.

In a twenty-third aspect, provided is a computer-readable storage medium, where the computer-readable storage medium stores one or more computer-executable instructions, and the one or more computer-executable instructions are used for causing a computer to execute any one method of the above fourteenth aspect.

In a twenty-fourth aspect, provided is a computer-readable storage medium, where the computer-readable storage medium stores one or more computer-executable instructions, and the one or more computer-executable instructions are used for causing a computer to execute the any one method of the above fifteenth aspect.

DETAILED DESCRIPTION OF THE EMBODIMENTS

Figure 1:
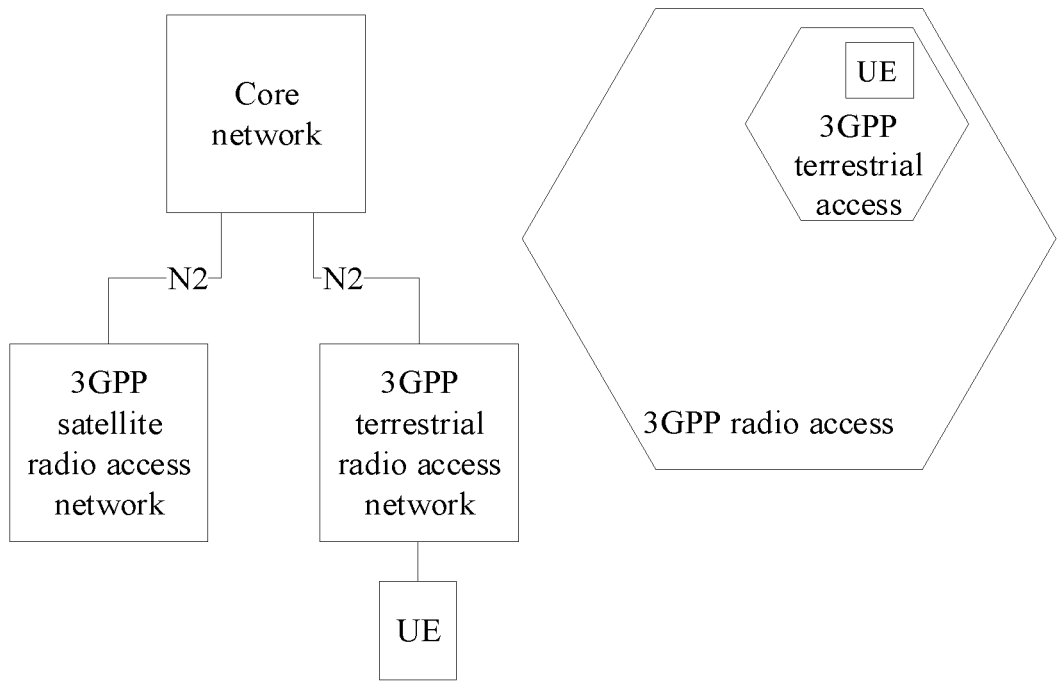
FIG. 1 is a schematic diagram of a satellite access base station and a terrestrial access base station connected to a same AMF entity in an embodiment of the present application.

The described embodiments are a part of the embodiments of the present application, but not all the embodiments. On the basis of the embodiments in the present application, all other embodiments obtained by those of ordinary skill in the art without inventive efforts fall within the protection scope of the present application.

Embodiments of the present application may be applied to various communication systems, such as: Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, Universal Mobile Telecommunication System (UMTS), and New Radio (NR).

It should also be understood that, in the embodiments of the present application, User Equipment (UE) includes but is not limited to a Mobile Station (MS), a Mobile Terminal, a Mobile Telephone, a handset and portable equipment, etc. The user equipment can communicate with one or more core networks via a Radio Access Network (RAN). For example, the user equipment can be a Mobile Telephone (or called a "cellular" telephone), a computer with radio communication function, etc. The user equipment can also be a portable, pocket-sized, handheld, computer built-in or vehicle-mounted mobile device.

In an embodiment of the present application, a base station (for example, an access point) may refer to a device that communicates with a wireless terminal through one or more sectors on an air interface in an access network. The base station can be used for interconverting a received air frame and an IP packet as a router between a wireless terminal and rest of the access network, and the rest of the access network can include an Internet Protocol (IP) network. The base station can also coordinate attribute management of the air interface. For example, the base station can be a base station (Base Transceiver Station, BTS) in GSM or CDMA, a base station (NodeB) in TD-SCDMA or WCDMA, or an evolutional base station (eNodeB or eNB or e-NodeB (evolutional Node B)) in LTE, or a base station (gNB) in 5G NR, which is not limited in the present application.

Hereinafter, some terms in the embodiments of the present application will be explained to facilitate the understanding of those skilled in the art.

(1) In the embodiments of the present application, the terms "network" and "system" are often used interchangeably, but those skilled in the art can understand their meaning.

(2) In the embodiments of the present application, the term "multiple" means two or more than two, and other quantifiers are similar thereto.

(3) The wording "and/or" describes the association relationship of the associated objects, and indicates that three relationships may exist, for example, A and/or B may indicate three conditions: A exists alone, A and B exist simultaneously, and B exists alone. The character "/" generally indicates that the former and latter associated objects are in an "or" relationship.

(4) A terminal is a device that provides voice and/or data connectivity to a user, and may include various handheld devices, vehicle-mounted devices, wearable devices, computing devices, unmanned aerial vehicles, or other processing devices connected to a wireless modem, as well as various forms of User Equipment (UE), Mobile Station (MS), Terminal Equipment, Transmission and Receiver Point (TRP, or Transmission Point (TP)), and so on, which have wireless communication functions.

(5) A base station is a device that connects the terminal to the radio network, including but not limited to: evolved Node B (eNB), Radio Network Controller (RNC), Node B (NB), Base Station Controller (BSC), Base Transceiver Station (BTS), home base station (for example, Home evolved NodeB, or Home Node B (HNB)), Base Band Unit (BBU), Wireless Fidelity (WIFI) Access Point (AP), Transmission and Receiver Point (TRP, or Transmission Point (TP)), the evolving node B (gNB), radio access network (RAN) nodes, etc.

In a 5G system that supports satellite access, there are the following two scenarios where satellite access and terrestrial access coexist.

Scenario 1: as shown in FIG. 1, a satellite access network and a terrestrial access network belong to a same public land mobile network (PLMN) and are therefore connected to a same core network. A satellite access base station and a terrestrial access base station are connected to a same AMF entity.

Figure 2:
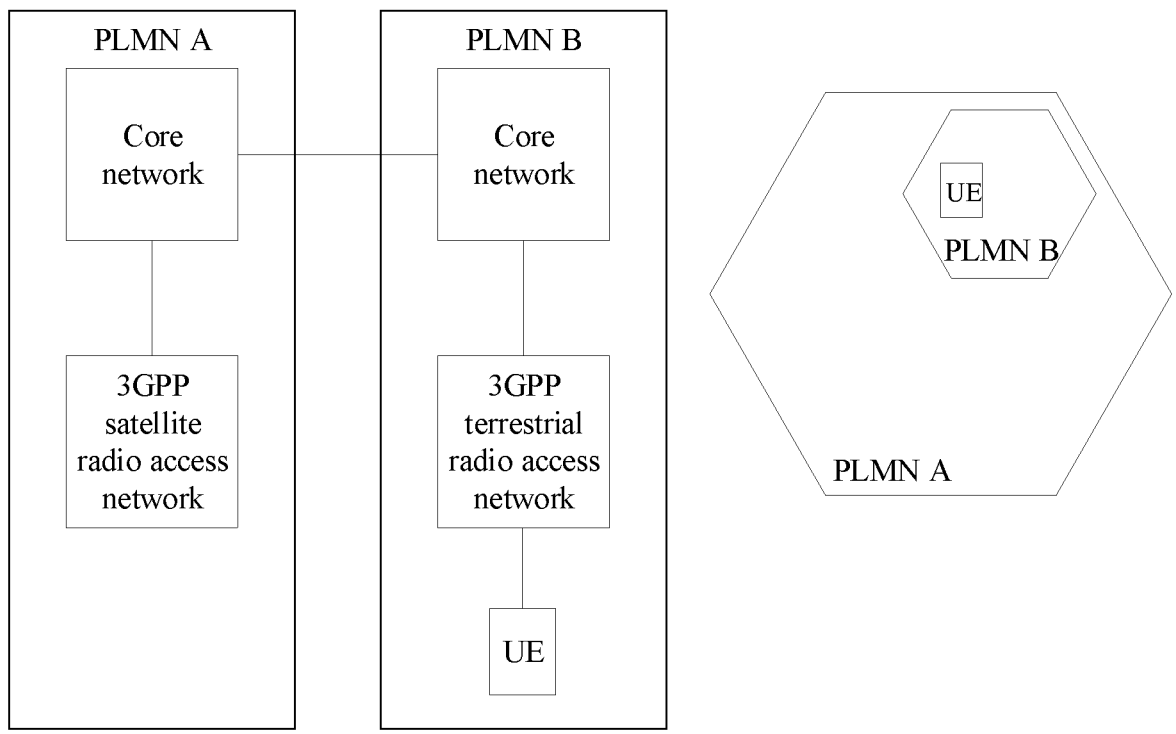
FIG. 2 is a schematic diagram of a satellite access base station and a terrestrial access base station connected to different AMF entities in an embodiment of the present application.

Scenario 2: as shown in FIG. 2, the satellite access network and the terrestrial access network belong to different PLMNs and are therefore connected to different core networks. The satellite access base station and the terrestrial access base station are connected to different AMF entities, but can be connected to a same SMF entity. There is a network interface to the same SMF entity between PLMN A and PLMN B as shown in the figure.

Figure 3:
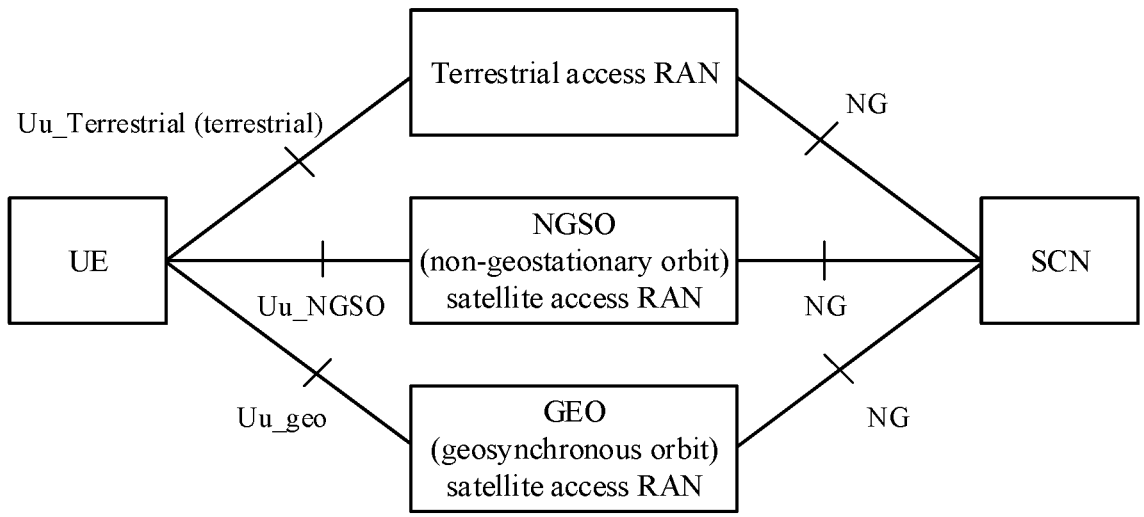
FIG. 3 is a schematic diagram of multi-connection transmission based on satellite access in an embodiment of the present application.

On the basis of the scenario of coexistence of multiple access networks, UE can establish multiple PDU sessions using multiple access technologies, or establish a multi-access PDU session, but the multi-access PDU session corresponds to at least two user plane connections, where the at least two user plane connections correspond to at least two radio access networks (different user plane connections correspond to different radio access networks), or in other words, the at least two user plane connections are associated with at least two access types (different user plane connections are associated with different access types). As shown in FIG. 3, the UE establishes multiple PDU sessions through terrestrial access, non-synchronous satellite access and synchronous satellite access, or establishes a multi-access PDU session, but the multi-access PDU session corresponds to a user plane connection of terrestrial access, a user plane connection of non-synchronous satellite access, and a user plane connection of synchronous satellite access. Between the UE and the network, data flows can be directed or switched using different PDU sessions or different user-plane connections of the same multi-access PDU session, provided that a user plane transmission path exists for the relevant PDU sessions.

The UE can use the same PDU session ID to establish two sub PDU sessions or two user plane connections in a 3GPP access network and a non-3GPP access network of the same PLMN. During the establishing process of a second sub PDU session or user plane connection, the UE needs to indicate to the AMF entity that the established PDU session or user plane connection belongs to a multi-access PDU session. In this way, the AMF entity can select the same SMF entity for the second sub PDU session or user plane connection.

After the UE establishes mutually associated sub PDU sessions or a multi-access PDU session on both terrestrial access and satellite access, if downlink data arrives, the paging of the UE may be implemented on the basis of the embodiments of the present application to activate the mutually associated PDU sessions or activate one of at least two user plane connections of the multi-access PDU session.

It should be noted that the "PDU session activation" in the embodiments of the present application refers to activating the user plane connection of the PDU session, that is, establishing or resuming the user plane connection of the PDU session.

The embodiments of the present application will be described in detail below with reference to the drawings.

Figure 4:
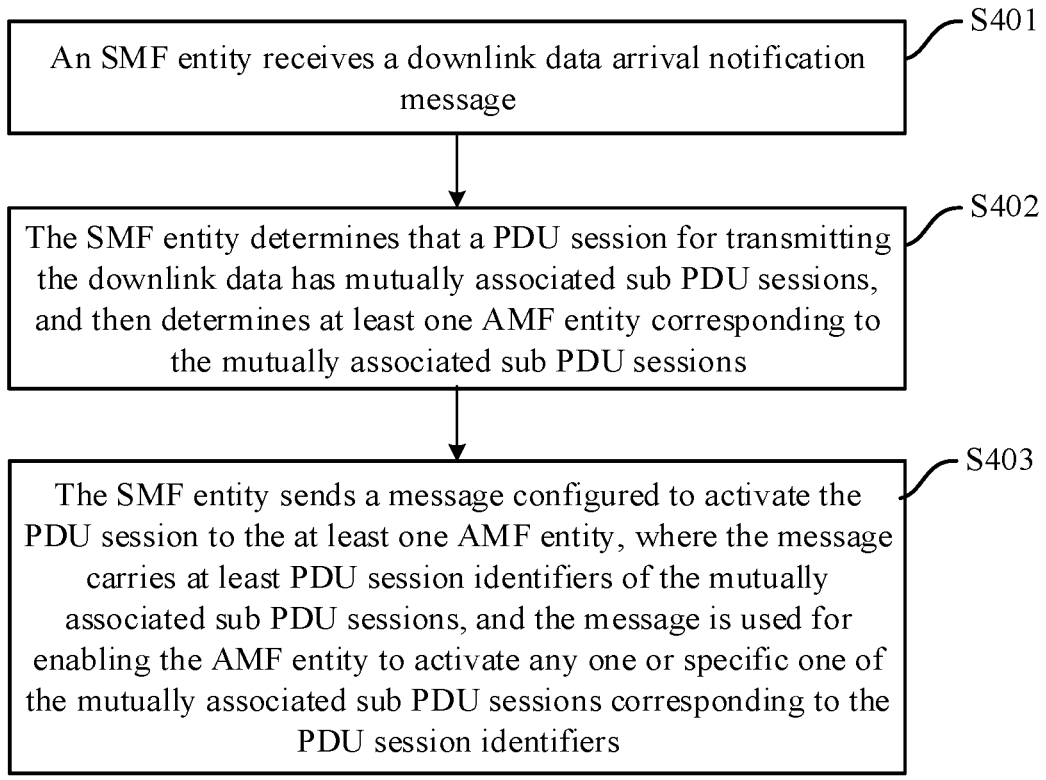
FIG. 4 is a block diagram of a PDU session activation flow implemented on an SMF entity side provided by an embodiment of the present application.

Referring to FIG. 4, a PDU session activation flow implemented on an SMF entity side provided by an embodiment of the present application, as shown in the figure, may include S401, S402 and S403.

S401: an SMF entity receives a downlink data arrival notification message.

The downlink data arrival notification message may carry QoS flow information of a downlink data packet, where QoS is the abbreviation of quality of service. The QoS flow information may include QoS flow identifiers, QoS parameters (such as session-aggregated maximum bit rate (Session-AMBR)), service characteristics (such as service type and quintuple information), operator policies, and the like.

The downlink data arrival notification message may also be expressed as a DL data notification message. The embodiments of the present application do not limit the naming manner of the message.

S402: the SMF entity determines that a PDU session for transmitting downlink data has mutually associated sub PDU sessions, and then determines at least one AMF entity corresponding to the mutually associated sub PDU sessions.

In this step, the SMF entity may determine the corresponding sub PDU session according to the QoS flow information carried in the downlink data arrival notification message, such as a sub PDU session corresponding to the quintuple information. Further, the SMF entity can determine that there are mutually associated multiple sub PDU sessions according to the context of the sub PDU session, and can determine a sub PDU session that needs to be activated in the mutually associated multiple sub PDU sessions according to QoS flow information (such as operator policy), for example, any or specified one of the mutually associated multiple sub PDU sessions can be activated.

S403: the SMF entity sends a message configured to activate the PDU session to the at least one AMF entity, where the message configured to activate the PDU session carries at least session identifiers of the mutually associated sub PDU sessions, and the message configured to activate the PDU session enables the AMF entity to activate any or specified one of the mutually associated sub PDU sessions corresponding to the session identifiers.

The message configured to activate the PDU session may be a message related to an N1N2 message transmission service, and may be expressed as a Namf_Communication_N1N2MsgTransfer message. The embodiments of the present application do not limit the naming manner of the message.

On the basis of the above process, in a possible implementation, the SMF entity determines to activate any one of the mutually associated sub PDU sessions, and then in S403, for each sub PDU session of the mutually associated sub PDU sessions, the SMF entity sends a message configured to activate the PDU session to the at least one AMF entity, where each message configured to activate the PDU session carries session identifiers of the mutually associated sub PDU sessions, association indication information, and radio access type indication information corresponding to the targeted PDU session, where the association indication information indicates activation of any one of the mutually associated sub PDU sessions. In this way, the AMF entity may activate any one of the mutually associated sub PDU sessions.

Further, if the SMF entity determines that the mutually associated sub PDU sessions correspond to a same AMF entity, in S403, the SMF entity sends the message configured to activate the PDU session to the same AMF entity, so that PDU session activation can be achieved for the scenario shown in FIG. 1. If the SMF entity determines that the mutually associated sub PDU sessions correspond to different AMF entities, in S403, the SMF entity sends the message configured to activate the PDU session to the different AMF entities respectively, so that PDU session activation can be achieved for the scenario shown in FIG. 2.

In one embodiment, the message configured to activate the PDU session may further carry uplink tunnel information of the targeted sub PDU session, so that a corresponding uplink tunnel can be established for transmitting uplink data.

On the basis of the above process, in another possible implementation, if the SMF entity determines that the mutually associated sub PDU sessions correspond to a same AMF entity, and determines to activate any one of the mutually associated sub PDU sessions, in S403, the message configured to activate the PDU session is sent to the same AMF entity, where the message configured to activate the PDU session carries session identifiers of the mutually associated sub PDU sessions, and the message neither carries access type information nor carries uplink tunnel information. The AMF entity may determine to activate any one of the mutually associated sub PDU sessions according to the message.

On the basis of the above process, in another possible implementation, if the SMF entity determines that the mutually associated sub PDU sessions correspond to a same AMF entity, and determines to activate a specified sub PDU session of the mutually associated sub PDU sessions, in S403, the SMF entity sends the message configured to activate the PDU session to the same AMF entity, where the message configured to activate the PDU session carries session identifiers of the mutually associated sub PDU sessions and radio access type information corresponding to the specified PDU session, so that PDU session activation can be achieved for the scenario shown in FIG. 1. If the SMF entity determines that the mutually associated sub PDU sessions correspond to different AMF entities, and determines to activate the specified sub PDU session of the mutually associated sub PDU sessions, the AMF entity corresponding to the specified PDU session is determined, and the message configured to activate the PDU session is sent to the AMF entity corresponding to the specified PDU session, where the message configured to activate the PDU session carries the session identifiers of the mutually associated sub PDU sessions, so that PDU session activation can be achieved for the scenario shown in FIG. 2.

In one embodiment, the message configured to activate the PDU session may further carry uplink tunnel information of the targeted sub PDU session, so that a corresponding uplink tunnel can be established for transmitting uplink data.

On the basis of the above process, in a possible implementation, the method may further includes: the SMF entity receives a session update request message sent by the at least one AMF entity, where the session update request message carries radio access type information; and the SMF entity activates a user plane connection of the sub PDU sessions according to the session update request message, so that downlink data is transmitted through the sub PDU sessions.

The session update message can also be expressed as an N4 Session Modification message. The embodiments of the present application do not limit the naming manner of the message.

Figure 5:
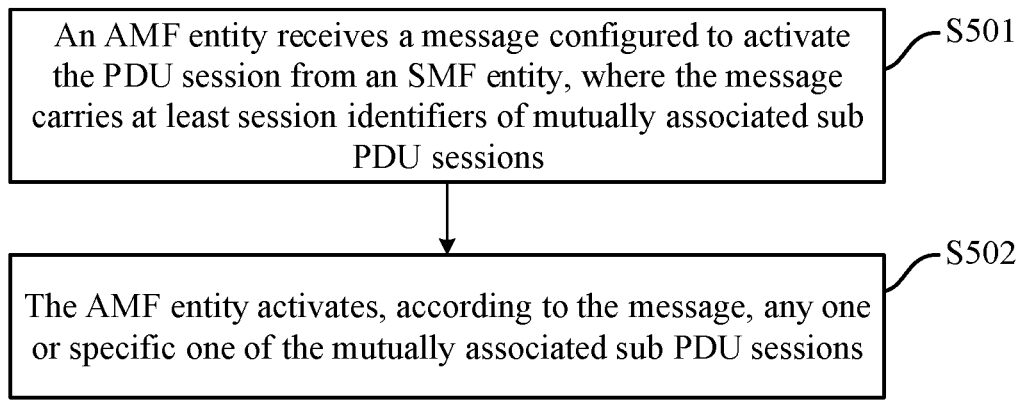
FIG. 5 is a block diagram of a PDU session activation flow implemented on an AMF entity side provided by an embodiment of the present application.

Referring to FIG. 5, a PDU session activation flow implemented on an AMF entity side provided by an embodiment of the present application, as shown in the figure, may include S501 and S502.

S501: an AMF entity receives a message configured to activate the PDU session from an SMF entity, where the message configured to activate the PDU session carries at least session identifiers of mutually associated sub PDU sessions.

For the related description of the message configured to activate the PDU session, reference can be made to the flow shown in FIG. 4, which will not be repeated here.

S502: the AMF entity activates, according to the message configured to activate the PDU session, any or specified one of the mutually associated sub PDU sessions.

On the basis of the above process, in a possible implementation, the message configured to activate the PDU session further carries association indication information and access type indication information, where the association indication information indicates activation of any one of the mutually associated sub PDU sessions. In S502, the AMF entity determines that a terminal corresponding to the mutually associated sub PDU sessions is in a connected state in a radio access network corresponding to the access type indication information, and then activates a sub PDU session corresponding to the PDU session identifier in the radio access network corresponding to the access type indication information.

On the basis of the above process, in a possible implementation, the message configured to activate the PDU session may further carry association indication information and access type indication information, where the association indication information indicates activation of any one of the mutually associated sub PDU sessions. In S502, the AMF entity determines that the terminal corresponding to the mutually associated sub PDU sessions is in an idle state in all radio access networks corresponding to the mutually associated sub PDU sessions, and then sends a paging request message to an RAN node in the radio access network corresponding to the access type indication information, where the paging request message carries the association indication information or an association sequence number generated by the AMF entity. The association sequence number generated by the AMF may be generated by the AMF on the basis of the association indication information, or may be independently generated by the AMF itself. After receiving a paging message carrying the association indication information, the terminal may ignore a subsequently received paging message carrying the same association indication information.

Further, the above method may further include: the AMF entity determines whether to page the terminal in all the radio access networks; when the AMF entity determines to page the terminal in all the radio access networks, after receiving the message configured to activate the PDU session from the SMF entity, the paging request message is immediately sent; when the AMF entity determines not to page the terminal in all the radio access networks, whether the received message configured to activate the PDU session is a first message configured to activate the PDU session carrying the same PDU session identifier is determined, when the received message configured to activate the PDU session is the first message configured to activate the PDU session carrying the same PDU session identifier, the paging request message immediately sent, when the received message configured to activate the PDU session is not the first message configured to activate the PDU session carrying the same PDU session identifier, after waiting for failure of paging the terminal in other radio access networks, the paging request message is sent to an RAN node in a radio access network corresponding to the access type indication information.

On the basis of the above process, in a possible implementation, in S502, the AMF entity determines that the terminal corresponding to the mutually associated sub PDU sessions is in a connected state in a first radio access network, and then activates a sub PDU session corresponding to the PDU session identifier in the first radio access network, where the first radio access network is any one of multiple radio access networks corresponding to the mutually associated sub PDU sessions.

On the basis of the above process, in a possible implementation, in S502, the AMF entity determines that the terminal corresponding to the mutually associated sub PDU sessions is in an idle state in all radio access networks corresponding to the mutually associated sub PDU sessions, and then determines whether to page the terminal in all the radio access networks; when the AMF entity determines to page the terminal in all the radio access networks, a paging request message is sent to RAN nodes in all the radio access networks corresponding to the mutually associated sub PDU sessions respectively; when the AMF entity determines not to page the terminal in all the radio access networks, whether the received message configured to activate the PDU session is a first message configured to activate the PDU session carrying the same PDU session identifier is determined, when the received message configured to activate the PDU session is the first message configured to activate the PDU session carrying the same PDU session identifier, the paging request message is sent to the RAN node in the first radio access network, or when the received message configured to activate the PDU session is not the first message configured to activate the PDU session carrying the same PDU session identifier, after waiting for failure of paging the terminal in the radio access network where the RAN node in the first radio access network is located, the paging request message is sent to an RAN node in a second radio access network, where the RAN node in the first radio access network and the RAN node in the second radio access network are different RAN nodes among the RAN nodes in the radio access networks corresponding to the mutually associated sub PDU sessions.

On the basis of the above process, in a possible implementation, radio access networks corresponding to the mutually associated sub PDU sessions include a first radio access network and a second radio access network, the message configured to activate the PDU session further carries access type indication information, and the access type indication information corresponds to the first radio access network. In S502, the following situations are included.

Situation 1, the AMF entity determines that the terminal corresponding to the mutually associated sub PDU sessions is in a connected state in a first radio access network corresponding to the access type indication information, and then activates a sub PDU session corresponding to the PDU session identifier in the first radio access network.

Situation 2: the AMF entity determines that the terminal corresponding to the mutually associated sub PDU sessions is in a connected state in the second radio access network, and then sends a notification message to the RAN node in the second access network, where the notification message is used for notifying the terminal of activating the PDU session corresponding to the PDU session identifier in the first radio access network.

Situation 3: the AMF entity determines that the terminal corresponding to the mutually associated sub PDU sessions is in an idle state in the second radio access network, and then sends the paging request message to the RAN node in the second radio access network, and sends a reject message to the terminal after receiving a service request message sent by the terminal, and the reject message is used for instructing the terminal to initiate a service request process in the first access network.

On the terminal side, the terminal receives a first paging message from a first radio access network corresponding to a first PDU session, where the first paging message carries association indication information or an association sequence number, and the association indication information or the association sequence number indicates that the terminal has a second paging message carrying the same association indication information or the same association sequence number; the terminal responds to the first paging message and ignores the second paging message; or, the terminal responds to the second paging message and ignores the first paging message.

In the process of responding to the paging message, the terminal may send a service request message to the AMF entity. Further, the terminal receives a reject message sent by the AMF entity, where the reject message is used for instructing the terminal to initiate a service request process in a second access network corresponding to a second sub PDU session associated with the first sub PDU session; and the terminal initiates the service request process through the second access network corresponding to the second sub PDU session according to the reject message.

In the processes shown in FIGS. 4 and 5, the description is made by taking the activation of one of the mutually associated sub PDU sessions as an example. The implementation principle of the above process is also applicable to the process of activating any or specified one of the at least two user plane connections of one multi-access PDU session.

On the basis of the processes shown in FIGS. 4 and 5 above, the mutually associated sub PDU sessions are replaced with at least two user plane connections of one multi-access PDU session, and then on the basis of the process shown in FIG. 4 above, it is possible to obtain the process of activating any or specified one of at least two user plane connections of one multi-access PDU session.

Several specific examples are used below to describe in detail the above embodiments of the present application.

EXAMPLE 1

In this example, UE establishes a PDU session 1 through a terrestrial access radio access network (RAN) node, and establishes a PDU session 2 through a satellite access RAN node respectively. The satellite access RAN node and the terrestrial access RAN node are connected to the same AMF entity. The two PDU sessions are associated using the same PDU session identifier (for example, a session mark can be associated in the context of the two PDU sessions respectively), and the two PDU sessions are called mutually associated sub PDU sessions. Before activating the PDU session, the UE is in an idle state in both the satellite access network and the terrestrial access network. After receiving the message configured to activate the PDU session sent by the SMF entity, the AMF entity confirms to activate any one of the mutually associated sub PDU sessions.

Figure 6:
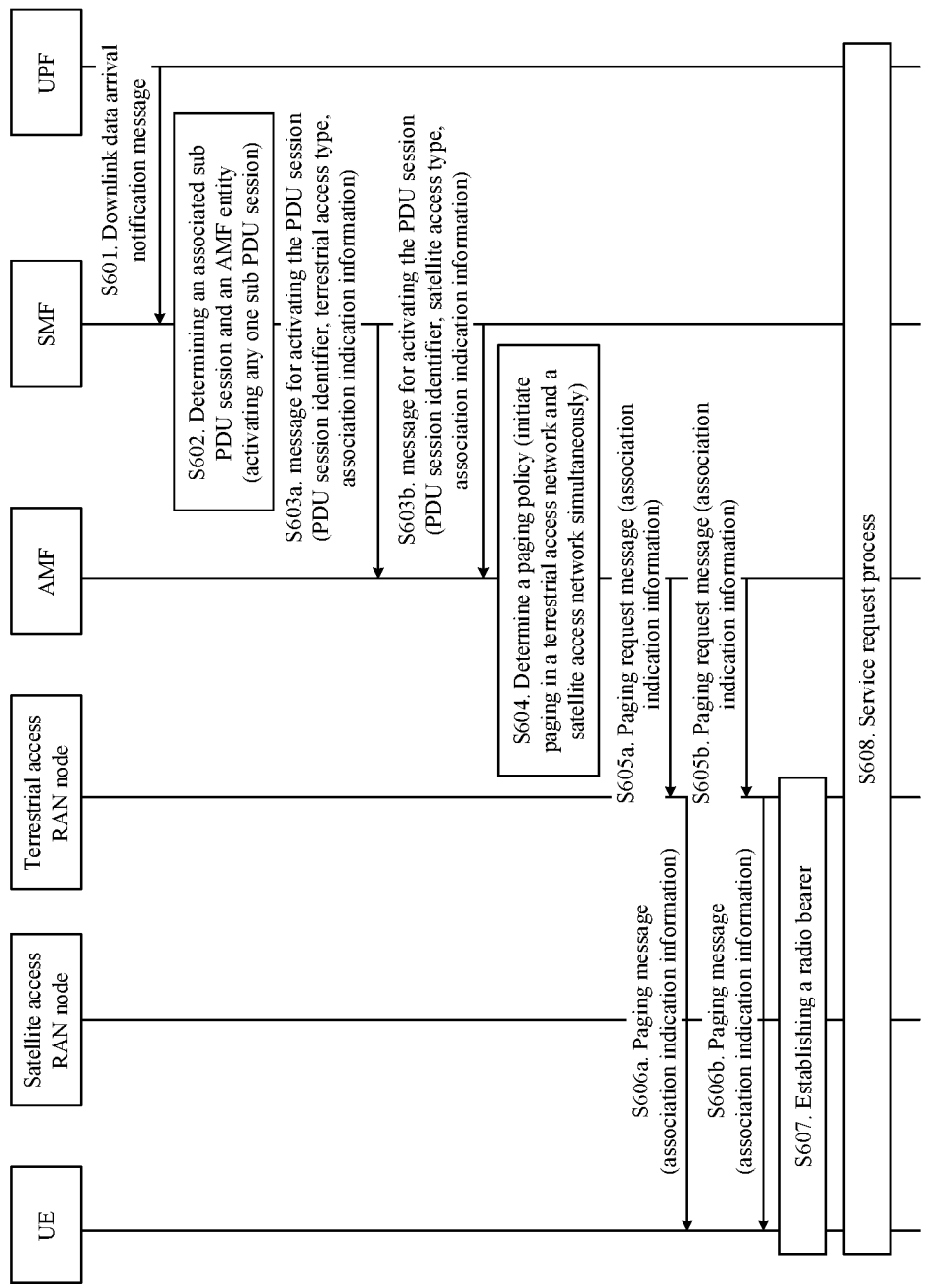
FIG. 6 is a signaling diagram of a PDU session activation flow in Example 1 in an embodiment of the present application.

As shown in FIG. 6, the process of Example 1 may include: S601 to S608.

S601: an SMF entity receives a downlink data arrival notification message from a UPF entity.

The downlink data arrival notification message may carry QoS flow information of a downlink data packet, where the QoS flow information may include QoS flow identifiers, QoS parameters (such as Session-AMBR), service features (such as service type and quintuple information), operator policies, and the like.

S602: the SMF entity determines that a sub PDU session for transmitting downlink data has associated sessions according to the notification message, and determines a sub PDU session that needs to be activated, and an AMF entity corresponding to the sub PDU session that needs to be activated.

In this step, the SMF entity may determine the corresponding sub PDU session according to the QoS flow information carried in the notification message, such as the sub PDU session corresponding to the quintuple information. According to the context of the sub PDU session, the SMF entity determines that there are mutually associated PDU session 1 and PDU session 2, where PDU session 1 is a sub PDU session corresponding to the terrestrial access network, and PDU session 2 is a sub PDU session corresponding to the satellite access network.

The SMF entity can determine a sub PDU session that needs to be activated in the mutually associated sub PDU session 1 and PDU session 2 according to the QoS flow information (such as operator policies). In this example, the SMF entity determines that the PDU session 1 or the PDU session 2 can be activated, that is, any one of the mutually associated sub PDU sessions can be activated.

Since the satellite access RAN node and the terrestrial access RAN node are connected to the same AMF entity in this example, the SMF entity determines that the PDU session 1 and the PDU session 2 correspond to the same AMF entity.

S603a-603b: for each of the mutually associated sub PDU sessions (i.e., the PDU session 1 and the PDU session 2), the SMF entity sends a message configured to activate the PDU session to the AMF entity respectively.

The message sent in S603a carries a PDU session identifier, uplink tunnel information corresponding to the PDU session 1, radio access type indication information (access type) for indicating the terrestrial access type, and the association indication (indicator). The message sent in S603b carries a PDU session identifier, uplink tunnel information corresponding to the PDU session 2, radio access type indication information (access type) for indicating the satellite access type, and the association indication (indicator), and the PDU session identifier carried in the message sent in S603b is the same as the PDU session identifier carried in the message sent in S603a.

The uplink tunnel information may be allocated by the SMF entity for the sub PDU session, or may be allocated by the UPF entity for the above sub PDU session. The uplink tunnel information may include tunnel endpoint information of the sub PDU session.

S604: after receiving the message configured to activate the PDU session, the AMF entity determines that the UE corresponding to the PDU session identifier carried in the message is in an idle state in both the terrestrial access network and the satellite access network, and then determines a paging policy for the UE, that is, whether to page the UE in the terrestrial access network and the satellite access network simultaneously, or to first page the UE in one of the access networks, and to page the UE in the other access network if the paging fails.

In this step, the AMF entity may determine whether to page in the terrestrial access network and the satellite access network simultaneously according to a service delay tolerance feature, or may determine whether to page in the terrestrial access network and the satellite access network simultaneously according to a configured paging policy. In this example, the AMF entity determines to page the UE in both the terrestrial access network and the satellite access network.

S605a-S606a (S605b-S606b): the AMF entity determines that the UE needs to be paged in the terrestrial access network and the satellite access network simultaneously, and then sends a paging request message to an RAN node in a radio access network according to the radio access network indicated by the access type indication information carried in a currently received message configured to activate the PDU session, where a paging message is carried in the paging request message. The paging message carries the identifier of the UE and the association indication information (indicator). The corresponding RAN node sends the paging message.

Specifically, in S605a-S606a, the AMF entity sends a paging request message to the terrestrial access RAN node according to the terrestrial access type indication information carried in the currently received message configured to activate the PDU session; in S605b-S606b, the AMF entity sends a paging request message to the satellite access RAN node according to the satellite access type indication information carried in the currently received message configured to activate the PDU session.

In this step, the uplink tunnel information may be carried in the paging request message to be sent to the RAN node by the AMF entity, so that the RAN node may use the tunnel information when sending uplink data.

S607: after receiving the paging message, the UE responds to the paging message, and establishing a radio connection (i.e., establishing a radio bearer) between the UE and the RAN node. If the paging message carries the association indication information or the association sequence number, the UE ignores the subsequently received paging message carrying the same association indication information after responding to the paging message.

In this example, the establishment of a radio connection between the UE and the terrestrial access RAN node is described as an example.

S608: after the radio connection between the UE and the RAN node is established, a service request process to the network side is initiated.

In the service request process, the AMF entity sends a session update request message to the SMF entity, where the session update request message carries access network type indication information (Access type) where the UE responds to paging. The SMF entity determines to activate the corresponding PDU session according to the access network indicated by the access network type indication information, and generates a corresponding data forwarding rule and configures the corresponding data forwarding rule to the UPF entity.

According to Example 1, in another case, if the AMF entity determines that the UE is in a connected state in the terrestrial access network and the access type indication information in the received message configured to activate the PDU session indicates a terrestrial access, the AMF entity activates a corresponding PDU session in the terrestrial access network; and if the AMF entity determines that the UE is in a connected state in the terrestrial access network and the access type indication information in the received message configured to activate the PDU session indicates a satellite access, the AMF entity waits for a second message configured to activate the PDU session, carrying access type indication information, from the SMF entity and ignores the currently received message configured to activate the PDU session.

According to Example 1, in another case, if the AMF entity determines that the UE is in a connected state in the satellite access network and the access type indication information carried in the received message configured to activate the PDU session indicates a satellite access, the AMF entity activates a corresponding PDU session in the satellite access network; and if the AMF entity determines that the UE is in a connected state in the satellite access network and the access type indication information carried in the received message configured to activate the PDU session indicates a terrestrial access, the AMF entity waits for a second message configured to activate the PDU session from the SMF entity carrying the access type indication information and ignores the currently received message configured to activate the PDU session.

EXAMPLE 2

In this example, UE establishes a PDU session 1 through a terrestrial access RAN node, and establishes a PDU session 2 through a satellite access RAN node respectively, where the satellite access RAN node and the terrestrial access RAN node are connected to the same AMF entity. The two PDU sessions are associated using the same PDU session identifier, and called mutually associated sub PDU sessions. Before activating the PDU session, the UE is in an idle state in both the satellite access network and the terrestrial access network. After receiving the message configured to activate the PDU session sent by the SMF entity, the AMF entity confirms to activate any one of the mutually associated sub PDU sessions.

Figure 7:
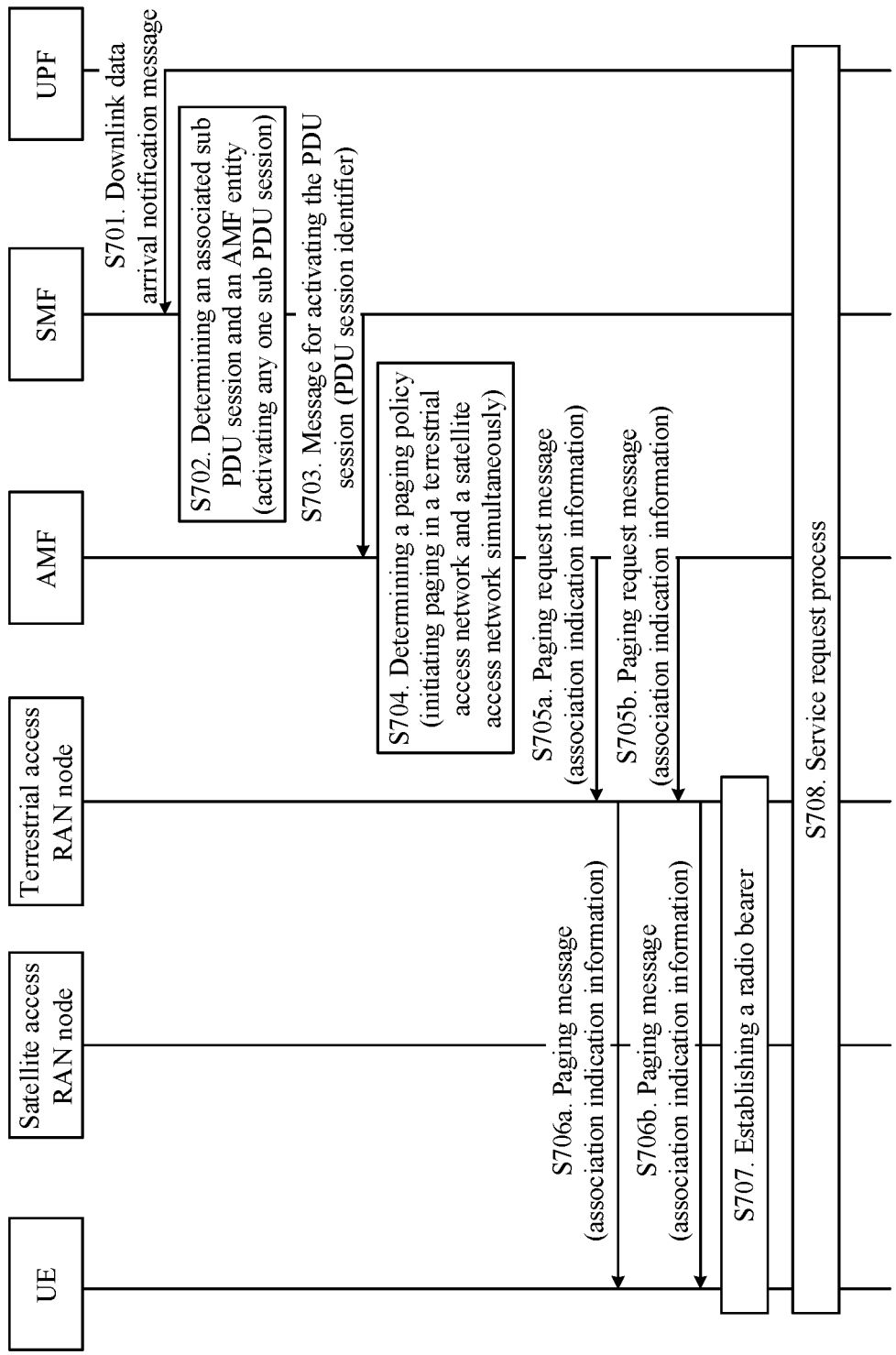
FIG. 7 is a signaling diagram of a PDU session activation flow in Example 2 in an embodiment of the present application.

As shown in FIG. 7, the process of Example 1 may include S701 to S708.

S701: an SMF entity receives a downlink data arrival notification message from a UPF entity.

The specific implementation of this step is basically the same as that of S601.

S702: the SMF entity determines that a sub PDU session for transmitting downlink data has mutually associated sub PDU sessions according to the downlink data arrival notification message, and determines a sub PDU session that needs to be activated, and an AMF entity corresponding to the sub PDU session that needs to be activated.

The specific implementation of this step is basically the same as that of S702.

S703: the SMF entity sends a message configured to activate the PDU session to the AMF entity.

The sent message carries a PDU session identifier, but does not carries any uplink tunnel information corresponding to the PDU session, nor does it carry radio access type indication information (access type) and association indication (indicator). By sending a session identifier that only carries the mutually associated sub PDU sessions to the AMF entity, the AMF entity can confirm that any one of the mutually associated sub PDU sessions can be activated.

S704: after receiving the message configured to activate the PDU session, the AMF entity determines that the UE corresponding to the PDU session identifier carried in the message is in an idle state in both the terrestrial access network and the satellite access network, and then determines a paging policy for the UE, that is, whether to page the UE in the terrestrial access network and the satellite access network simultaneously, or to first page the UE in one of the access networks, and to page the UE in the other access network if the paging fails.

The specific implementation of this step is basically the same as that of S702. In this example, the AMF entity determines to page the UE in both the terrestrial access network and the satellite access network.

S705a-S706a (S705b-S706b): the AMF entity determines that the UE needs to be paged in the terrestrial access network and the satellite access network simultaneously, and then sends a paging request message to the terrestrial access RAN node corresponding to the PDU session 1 and the satellite access RAN node corresponding to the PDU session 2 respectively, where a paging message is carried in the paging request message. The paging message carries the identifier of the UE and the association indication information (indicator). The corresponding RAN node sends the paging message.

Specifically, in S705a-S706a, the AMF entity sends the paging request message to the terrestrial access RAN node; and in S705b-S706b, the AMF entity sends the paging request message to the satellite access RAN node.

In this step, the uplink tunnel information can be carried in the paging request message to be sent to the RAN node by the AMF entity, so that the RAN node may use the tunnel information when sending uplink data.

S707: after receiving the paging message, the UE establishes a radio connection between the UE and the RAN node in response to the paging message. If the paging message carries the association indication information or the association sequence number, the UE ignores the subsequently received paging message carrying the same association indication information after responding to the paging message.

In this example, the establishment of a radio connection between the UE and the terrestrial access RAN node is described as an example.

S708: after the radio connection between the UE and the RAN node is established, a service request process to the network side is initiated.

In the service request process, the AMF entity sends a session update request message to the SMF entity, where the session update request message carries access network type indication information (Access type) where the UE responds to paging. The SMF entity determines to activate the corresponding PDU session according to the access network indicated by the access network type indication information, and generates a corresponding data forwarding rule and configures the corresponding data forwarding rule to the UPF entity.

According to Example 2, in other cases, the AMF entity receives the message configured to activate the PDU session sent by the SMF entity, and determines to activate any one of the mutually associated sub PDU sessions according to the PDU session identifier carried in the message, then, if the AMF entity determines that the UE is in the connected state in the terrestrial access network, the AMF entity sends to the SMF entity a session update request message for requesting the SMF entity to activate a corresponding PDU session in the terrestrial access network, and if the AMF entity determines that the UE is in the connected state in the satellite access network, the AMF entity sends to the SMF entity a session update request message for requesting the SMF entity to activate a corresponding PDU session in the satellite access network.

EXAMPLE 3

In this example, UE establishes a PDU session 1 through a terrestrial access RAN node, and establishes a PDU session 2 through a satellite access RAN node respectively, where the satellite access RAN node and the terrestrial access RAN node are connected to the same AMF entity. The two PDU sessions are associated using the same PDU session identifier, and called mutually associated sub PDU sessions. Before the PDU session is activated, the UE is in an idle state in the terrestrial access network. After receiving the message configured to activate the PDU session sent by the SMF entity, the AMF entity confirms to activate the PDU session 2 established through the satellite access RAN node in the associated PDU session 1.

Figure 8:
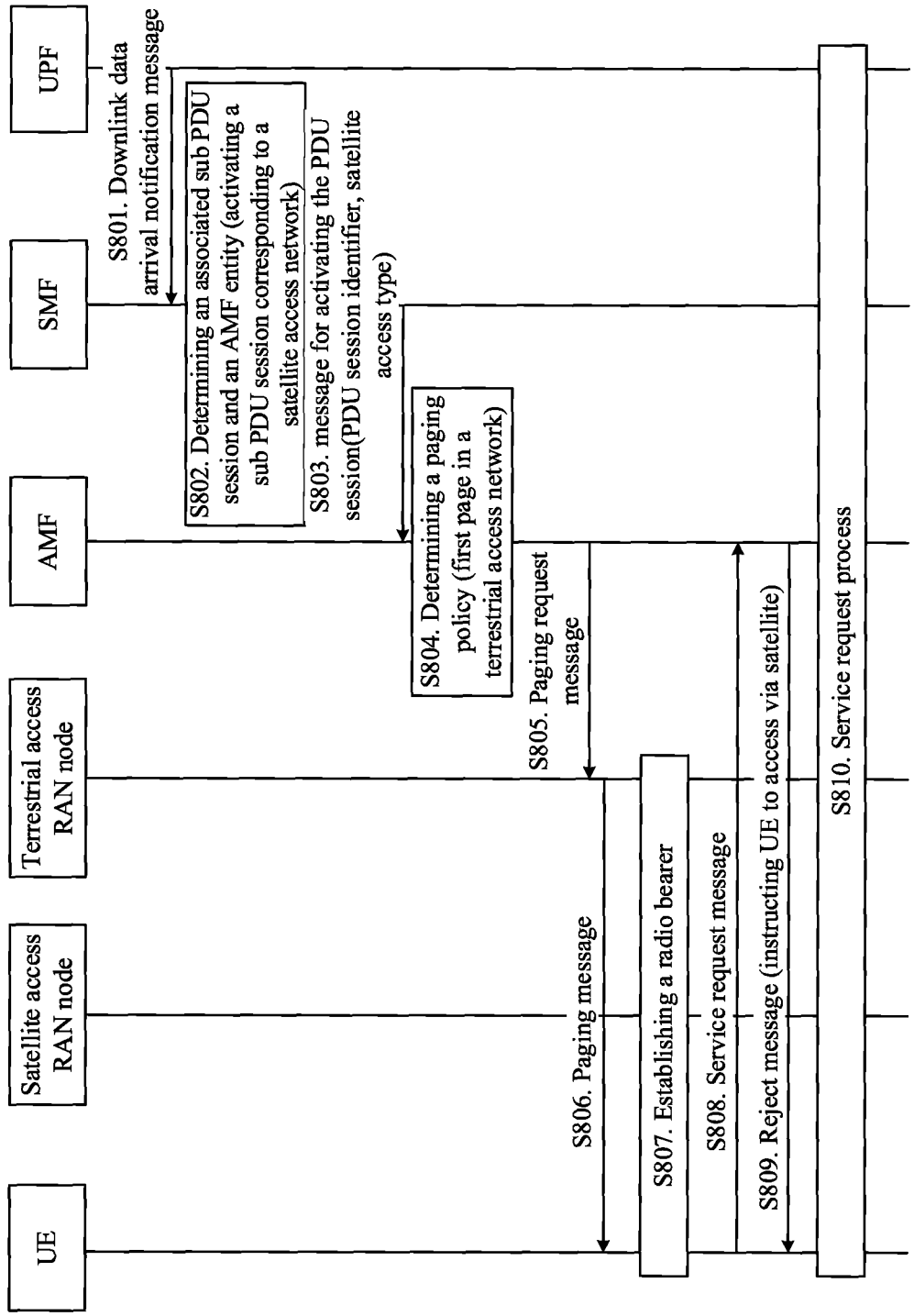
FIG. 8 is a signaling diagram of a PDU session activation flow in Example 3 in an embodiment of the present application.

As shown in FIG. 8, the process of Example 2 may include S801 to S810.

S801: an SMF entity receives a downlink data arrival notification message from a UPF entity.

The specific implementation of this step is basically the same as that of S601.

S802: the SMF entity determines that a sub PDU session for transmitting downlink data has mutually associated sub PDU sessions according to the downlink data arrival notification message, and determines a sub PDU session that needs to be activated, and an AMF entity corresponding to the sub PDU session that needs to be activated.

In this step, the SMF entity determines that the PDU session 2 needs to be activated. The rest processing in this step is basically the same as that of S602.

Since the satellite access RAN node and the terrestrial access RAN node are connected to the same AMF entity in this example, the SMF entity determines that the PDU session 1 and the PDU session 2 correspond to the same AMF entity.

S803: for the PDU session 2, the SMF entity sends a message configured to activate the PDU session to the AMF entity.

The message configured to activate the PDU session carries a PDU session identifier, and radio access type indication information (access type) for indicating the satellite access type. Further, the message configured to activate the PDU session may further carry uplink tunnel information corresponding to the PDU session 2.

The uplink tunnel information may be allocated by the SMF entity for the PDU session, or may be allocated by the UPF entity for the PDU session. The uplink tunnel information may include tunnel endpoint information of the PDU session.

S804: after receiving the message configured to activate the PDU session, the AMF entity determines to activate the PDU session 2 according to the radio access type indication information (access type) carried therein for indicating a satellite access type, and further determines that the UE corresponding to the PDU session identifier carried in this message is in the idle state in the terrestrial access network, then determines to first page the UE in the terrestrial access network.

S805-S806: the AMF entity sends a paging request message to the RAN node in the terrestrial access network, where a paging message is carried in the paging request message. The corresponding RAN node sends the paging message. The paging message carries the identifier of the UE.

In this step, the uplink tunnel information can be carried in the paging request message to be sent to the RAN node by the AMF entity, so that the RAN node may use the tunnel information when sending uplink data.

S807: after receiving the paging message, the UE establishes a radio connection (i.e., a radio bearer) between the UE and the terrestrial access RAN node in response to the paging message.

S808-S809: after the radio connection between the UE and the RAN node is established, a service request process to the network side is initiated.

In the service request process, the AMF rejects the service request of the UE, and indicates to the UE to access via a satellite in a reject message or a service response message.

S810: the UE initiates the service request process in the satellite access network according to the indication in the reject message or the indication in the service response message.

In the service request process, the AMF entity sends a session update request message to the SMF entity, where the session update request message carries satellite access network type indication information (Access type). The SMF entity determines to activate the corresponding PDU session 2 according to the access network indicated by the access network type indication information, and generates a corresponding data forwarding rule and configures same to the UPF entity.

According to Example 3, in other cases, when the AMF entity receives the message configured to activate the PDU session sent by the SMF entity, and determines to activate the PDU session in the satellite access network according to the access type indication information in the message, if it is determined that the UE is in a connected state in the terrestrial access network, a notification message is sent to the UE through the terrestrial access network to notify the UE of activating the PDU session in the satellite access network.

EXAMPLE 4

In this example, UE establishes a PDU session 1 through a terrestrial access RAN node, and establishes a PDU session 2 through a satellite access RAN node respectively, and the satellite access RAN node and the terrestrial access RAN node are connected to different AMF entities. The two PDU sessions are associated using the same PDU session identifier, and called mutually associated sub PDU sessions. Before the PDU session is activated, the UE is in an idle state in both the satellite access network and the terrestrial access network. After receiving the message configured to activate the PDU session sent by the SMF entity, the AMF entity confirms to activate any one of the mutually associated sub PDU sessions.

Figure 9:
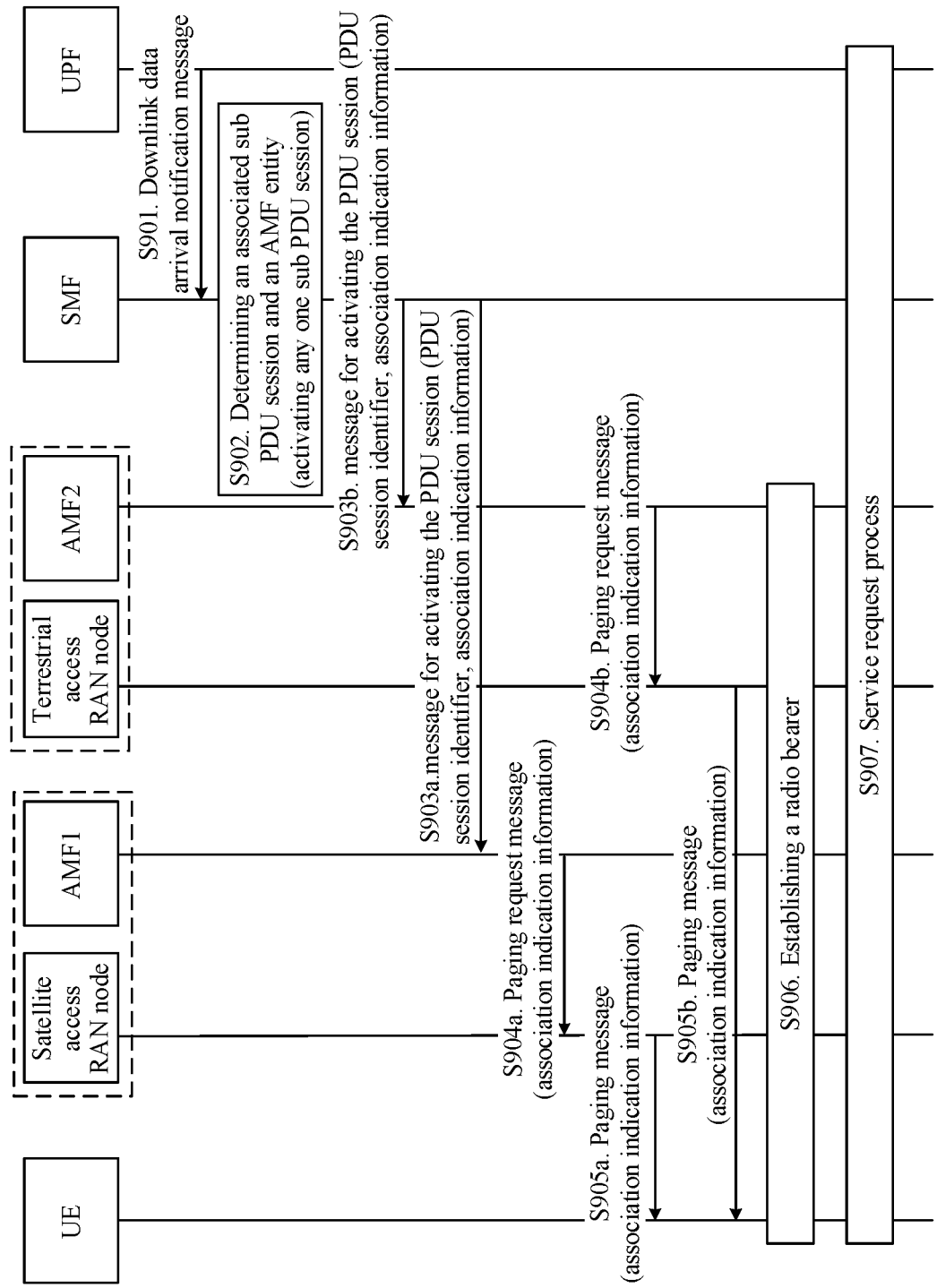
FIG. 9 is a signaling diagram of a PDU session activation flow in Example 4 in an embodiment of the present application.

As shown in FIG. 9, the process of Example 4 may include S901 to S907.

S901: an SMF entity receives a downlink data arrival notification message from a UPF entity.

The specific implementation of this step is basically the same as that of S601.

S902: the SMF entity determines that a PDU session for transmitting downlink data has associated sessions according to the downlink data arrival notification message, and determines a PDU session that needs to be activated, and an AMF entity corresponding to the PDU session that needs to be activated.

The specific implementation of this step is basically the same as that of S602.

In this example, the SMF entity determines that the PDU session 1 or the PDU session 2 can be activated, that is, any one of the mutually associated sessions can be activated.

Since the satellite access RAN node and the terrestrial access RAN node are connected to different AMF entities in this example, the SMF entity determines that the PDU session 1 and the PDU session 2 correspond to different AMF entities. Specifically, the terrestrial access RAN node is connected to AMF1 (that is, the PDU session 1 corresponds to AMF1), and the satellite access RAN node is connected to AMF2 (that is, PDU session 2 corresponds to AMF2).

S903a-903b: the SMF entity sends a message configured to activate the PDU session to the AMF1 entity corresponding to the PDU session 1 and to the AMF2 entity corresponding to the PDU session 2, respectively.

The message configured to activate the PDU session sent to the AMF1 entity carries identifiers of the mutually associated sub PDU sessions and the association indication information, and may further carry uplink tunnel information corresponding to the PDU session 1. The message configured to activate the PDU session sent to AMF2 carries identifiers of the mutually associated sub PDU sessions and the association indication information, and may further carry uplink tunnel information corresponding to the PDU session 2, where the PDU session identifier carried in the message configured to activate the PDU session sent to the AMF1 entity is the same as the PDU session identifier carried in the message configured to activate the PDU session sent to AMF2.

The uplink tunnel information may be allocated by the SMF entity for the PDU session, or may be allocated by the UPF entity for the PDU session. The uplink tunnel information may include tunnel endpoint information of the PDU session.

S904a-S905a: after receiving the message configured to activate the PDU session, the AMF1 entity determines that the UE corresponding to the PDU session identifier carried in the message is in the idle state in the terrestrial access network, and then sends a paging request message to the RAN node in the terrestrial radio access network, where a paging message is carried in the paging request message. The paging message carries the identifier of the UE and the association indication information (indicator). The corresponding RAN node sends the paging message.

S904b-S905b: after receiving the message configured to activate the PDU session, the AMF2 entity determines that the UE corresponding to the PDU session identifier carried in the message is in the idle state in the satellite access network, and then sends a paging request message to the RAN node in the satellite radio access network, where a paging message is carried in the paging request message. The paging message carries the association indication information (indicator). The corresponding RAN node sends the paging message.

In one embodiment, the uplink tunnel information can be carried in the paging request message to be sent to the RAN node by the AMF1 entity (or AMF2 entity), so that the RAN node may use the tunnel information when sending uplink data.

S906: after receiving the paging message carrying the association indication information or the association sequence number, the UE can immediately respond to the paging message in the access network where the paging message is received, or can decide, based on a policy, which access network to preferentially respond to the paging message. After responding to the paging message in the first access network, the UE automatically ignores the paging message received from the second access network carrying the same association indication information.

In this example, an example that the UE first responds to the paging message of the terrestrial access RAN node is adopted for description.

In this step, in the process that the UE responds to the paging message, if the AMF entity has previously received the uplink tunnel information of the PDU session sent by the SMF entity, the AMF entity may first request the access network to create an air interface bearer, and then request the SMF entity to update the context of the PDU session; otherwise, the AMF entity needs to first request the SMF entity to allocate the uplink tunnel information, and then request the access network to create an air interface bearer.

S907: the UE initiates a service request process.

In the service request process, the AMF entity sends a session update request message to the SMF entity, where the session update request message carries satellite access network type indication information (Access type). The SMF entity determines to activate the corresponding the PDU session 2 according to the access network indicated by the access network type indication information, and generates a corresponding data forwarding rule and configures same to the UPF entity.

Further, in this process, the SMF entity determines that the PDU session will be activated in any network, and then sends an instruction to stop paging to other networks associated with the PDU session, so that other networks no longer wait for a paging response from the UE.

According to Example 4, in other cases, when the AMF entity receives the message configured to activate the PDU session from the SMF entity, the process of trying to activate a sub PDU session according to the message content may include: if the message configured to activate the PDU session carries association indication information, determining to activate any one of the mutually associated sub PDU sessions; if the AMF entity determines that the UE is in the connected state in the current access network, notifying the UE of activating the specified sub PDU session, and the notification message carries an association indication; otherwise, instructing the RAN node to page the UE, and the paging request message carries the association indication information or the association sequence number.

According to Example 4, in other cases, the SMF entity determines to activate a specified sub PDU session in the mutually associated sub PDU sessions, and then the SMF only sends a message configured to activate the PDU session to the corresponding AMF entity for the sub PDU session that needs to be activated, and uplink tunnel information can be carried. After the AMF entity receives the message configured to activate the PDU session sent by the SMF entity, the process of trying to activate the sub PDU session according to the message content may include: by the AMF entity, determining whether the terminal is in a connected state in the access network corresponding to the specified sub PDU session, if so, activating the sub PDU session in the access network, otherwise, paging the UE normally.

In the above Examples 1-4, the description is made by taking the activation of one of the mutually associated sub PDU sessions as an example. The implementation principle of the above process is also applicable to the process of activating any or specified one of at least two user plane connections of one multi-access PDU session.

On the basis of the above Examples 1-4, the mutually associated sub PDU sessions 1 and 2 are replaced with user plane connection 1 and user plane connection 2 in at least two user plane connections of one multi-access PDU session, and then on the basis of the above Examples 1-4, it is possible to obtain the process of activating any or specified one of at least two user plane connections of one multi-access PDU session. The user plane connection 1 corresponds to the terrestrial access network, and the user plane connection 2 corresponds to the satellite access network.

An embodiment of the present application also provides an SMF entity apparatus. The SMF entity apparatus can implement the functions on the SMF entity side in the foregoing embodiments.

Figure 10:
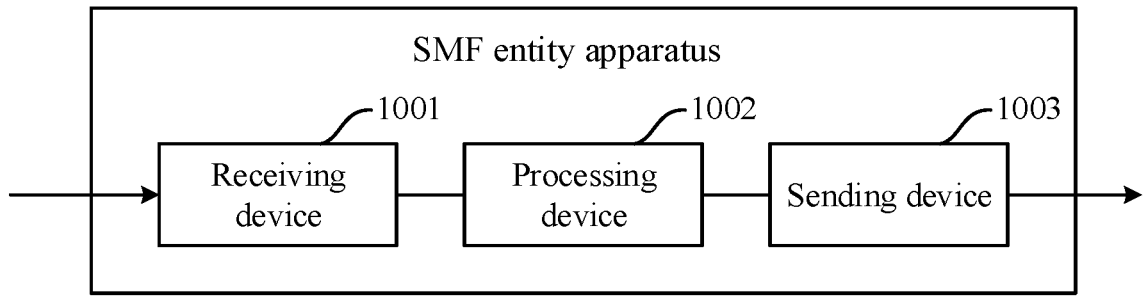
FIG. 10 is a schematic structural diagram of an SMF entity apparatus provided by an embodiment of the present application.

Referring to FIG. 10, FIG. 10 is a schematic structural diagram of an SMF entity apparatus according to an embodiment of the present application. As shown in the figure, the apparatus may include: a receiving device 1001, a processing device 1002 and a sending device 1003.

The receiving device 1001 is used for receiving a downlink data arrival notification message.

The processing device 1002 is used for determining that a sub PDU session for transmitting downlink data has mutually associated sub PDU sessions, and then determining at least one AMF entity corresponding to the mutually associated sub PDU sessions.

The sending device 1003 is used for sending a message configured to activate the PDU session to the at least one AMF entity, where the message configured to activate the PDU session carries at least session identifiers of the mutually associated sub PDU sessions, and the message configured to activate the PDU session enables the at least one AMF entity to activate any or specified one of the mutually associated sub PDU sessions corresponding to the session identifiers.

In one embodiment, the processing device 1002 is specifically used for: determining to activate any one of the mutually associated sub PDU sessions, and then for each of the mutually associated sub PDU sessions, sending, by the sending device 1003, a message configured to activate the PDU session to the at least one AMF entity, where each message configured to activate the PDU session carries the session identifiers of the mutually associated sub PDU sessions, association indication information, and radio access type indication information corresponding to the targeted sub PDU session, where the association indication information indicates activation of any one of the mutually associated sub PDU sessions.

In one embodiment, the processing device 1002 is specifically used for: determining that the mutually associated sub PDU sessions correspond to a same AMF entity, and then sending, by the sending device 1003, the message configured to activate the PDU session to the same AMF entity respectively; or, the processing device 1002 determines that the mutually associated sub PDU sessions correspond to different AMF entities, and then sends, by the sending device 1003, the message configured to activate the PDU session to the different AMF entities respectively.

In one embodiment, the processing device 1002 is specifically used for: determining that the mutually associated sub PDU sessions correspond to the same AMF entity, and determining to activate any one of the mutually associated sub PDU sessions, and then sending, by the sending device 1003, the message configured to activate the PDU session to the same AMF entity, where the message configured to activate the PDU session carries the session identifiers of the mutually associated sub PDU sessions.

In one embodiment, the processing device 1002 is specifically used for: determining that the mutually associated sub PDU sessions correspond to the same AMF entity, and determining to activate a specified sub PDU session of the mutually associated sub PDU sessions, and then sending, by the sending device 1003, the message configured to activate the PDU session to the same AMF entity, where the message configured to activate the PDU session carries the session identifiers of the mutually associated sub PDU sessions and radio access type information corresponding to the specified sub PDU session.

In one embodiment, the processing device 1002 is specifically used for: determining that the mutually associated sub PDU sessions correspond to different AMF entities, and determining to activate a specified sub PDU session of the mutually associated sub PDU sessions, and then determining the AMF entity corresponding to the specified PDU session, and sending, by the sending device 1003, the message configured to activate the PDU session to the AMF entity corresponding to the specified PDU session, where the message configured to activate the PDU session carries the session identifiers of the mutually associated sub PDU sessions.

In one embodiment, the message configured to activate the PDU session further carries uplink tunnel information of the targeted sub PDU session.

In one embodiment, the receiving device 1001 is further used for: receiving a session update request message sent by the at least one AMF entity, where the session update request message carries radio access type information; and the processing device 1002 is further used for activating a user plane connection of the sub PDU sessions according to the session update request message, so that downlink data is transmitted through the sub PDU sessions.

An embodiment of the present application also provides an AMF entity apparatus. The AMF entity apparatus can implement the functions on the AMF entity side in the foregoing embodiments.

In the apparatus shown in FIG. 10 above, the description is made by taking the activation of one of the mutually associated sub PDU sessions as an example. The above implementation principle is also applicable to the process of activating any or specified one of at least two user plane connections of one multi-access PDU session. On the basis of the apparatus shown in FIG. 10 above, the mutually associated sub PDU sessions are replaced with at least two user plane connections of one multi-access PDU session, and then on the basis of the apparatus shown in FIG. 10 above, it is possible to obtain an apparatus for activating any or specified one user plane connection of the at least two user plane connections of one multi-access PDU session.

Figure 11:
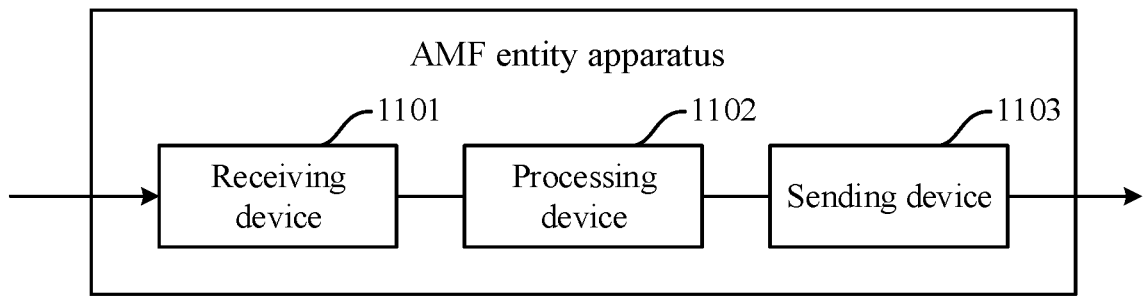
FIG. 11 is a schematic structural diagram of an AMF entity apparatus provided by an embodiment of the present application.

Referring to FIG. 11, FIG. 11 is a schematic structural diagram of an AMF entity apparatus provided by an embodiment of the present application. As shown in the figure, the AMF entity apparatus may include: a receiving device 1101 and a processing device 1102, and may further include a sending device 1103.

The receiving device 1101 is used for receiving a message configured to activate the PDU session from an SMF entity, where the message configured to activate the PDU session carries at least session identifiers of mutually associated sub PDU sessions.

The processing device 1102 is used for activating, according to the message configured to activate the PDU session, any or specified one of the mutually associated sub PDU sessions.

In one embodiment, the message configured to activate the PDU session further carries association indication information and access type indication information, and the association indication information is used for indicating activation of any one of the mutually associated sub PDU sessions. The processing device 1102 is specifically used for: determining that a terminal corresponding to the mutually associated sub PDU sessions is in a connected state in a radio access network corresponding to the access type indication information, and then activating a sub PDU session corresponding to the PDU session identifier in the radio access network corresponding to the access type indication information.

In one embodiment, the message configured to activate the PDU session further carries association indication information and access type indication information, and the association indication information is used for indicating activation of any one of the mutually associated sub PDU sessions. The processing device 1102 is specifically used for: determining that the terminal corresponding to the mutually associated sub PDU sessions is in an idle state in all radio access networks corresponding to the mutually associated sub PDU sessions, and then sending, by the sending device 1103, a paging request message to an RAN node in the radio access network corresponding to the access type indication information, and the paging request message carries the association indication information or an association sequence number generated by the AMF entity.

In one embodiment, the processing device 1102 is further used for: determining whether to page the terminal in all the radio access networks; when determining to page the terminal in all the radio access network, after receiving the message configured to activate the PDU session from the SMF entity, immediately sending, by the sending device 1103, the paging request message; when determining not to page the terminal in all the radio access network, determining whether the received message configured to activate the PDU session is a first message configured to activate the PDU session carrying the same PDU session identifier, when determining that the received message configured to activate the PDU session is the first message configured to activate the PDU session carrying the same PDU session identifier, immediately sending, by the sending device 1103, the paging request message, when determining that the received message configured to activate the PDU session is not the first message configured to activate the PDU session carrying the same PDU session identifier, after waiting for failure of paging the terminal in other radio access networks, sending, by the sending device 1103, the paging request message to an RAN node in a radio access network corresponding to the access type indication information.

In one embodiment, the processing device 1102 is specifically used for: determining that the terminal corresponding to the mutually associated sub PDU sessions is in a connected state in a first radio access network, and then activating a sub PDU session corresponding to the PDU session identifier in the first radio access network, where the first radio access network is any one of multiple radio access networks corresponding to the mutually associated sub PDU sessions.

In one embodiment, the processing device 1102 is specifically used for: determining that the terminal corresponding to the mutually associated sub PDU sessions is in an idle state in all radio access networks corresponding to the mutually associated sub PDU sessions, and then determining whether to page the terminal in all the radio access networks; when determining to page the terminal in all the radio access networks, respectively sending, by the sending device 1103, a paging request message to RAN nodes in all the radio access networks corresponding to the mutually associated sub PDU sessions; when determining not to page the terminal in all the radio access networks, determining whether the received message configured to activate the PDU session is a first message configured to activate the PDU session carrying the same PDU session identifier, when determining that the received message configured to activate the PDU session is the first message configured to activate the PDU session carrying the same PDU session identifier, sending, by the sending device 1103, the paging request message to the RAN node in the first radio access network, when determining that the received message configured to activate the PDU session is not the first message configured to activate the PDU session carrying the same PDU session identifier, after waiting for failure of paging the terminal in the radio access network where the RAN node in the first radio access network is located, sending, by the sending device 1103, the paging request message to an RAN node in a second radio access network, where the RAN node in the first radio access network and the RAN node in the second radio access network are different RAN nodes among the RAN nodes in the radio access networks corresponding to the mutually associated sub PDU sessions.

In one embodiment, the radio access networks corresponding to the mutually associated sub PDU sessions include a first radio access network and a second radio access network, the message configured to activate the PDU session further carries access type indication information, and the access type indication information corresponds to the first radio access network. The processing device 1102 is specifically used for: determining that the terminal corresponding to the mutually associated sub PDU sessions is in a connected state in the first radio access network corresponding to the access type indication information, and then activating a sub PDU session corresponding to the PDU session identifier in the first radio access network; or, determining that the terminal corresponding to the mutually associated sub PDU sessions is in a connected state in the second radio access network, and then sending, by the sending device 1103, a notification message to the RAN node in the second access network, where the notification message is used for notifying the terminal of activating a sub PDU session corresponding to the PDU session identifier in the first radio access network; or, determining that the terminal corresponding to the mutually associated sub PDU sessions is in an idle state in the second radio access network, and then sending, by the sending device 1103, the paging request message to the RAN node in the second radio access network, and sending a reject message to the terminal after receiving a service request message sent by the terminal, where the reject message is used for instructing the terminal to initiate a service request process in the first access network.

In the apparatus shown in FIG. 11 above, the description is made by taking the activation of one of the mutually associated sub PDU sessions as an example. The above implementation principle is also applicable to the process of activating any or specified one of at least two user plane connections of one multi-access PDU session. On the basis of the apparatus shown in FIG. 11 above, the mutually associated sub PDU sessions are replaced with at least two user plane connections of one multi-access PDU session, and then on the basis of the apparatus shown in FIG. 11 above, it is possible to obtain an apparatus for activating any or specified one of the at least two user plane connections of one multi-access PDU session.

An embodiment of the present application further provides a terminal. The terminal can implement the functions on the terminal side in the foregoing embodiments.

Figure 12:
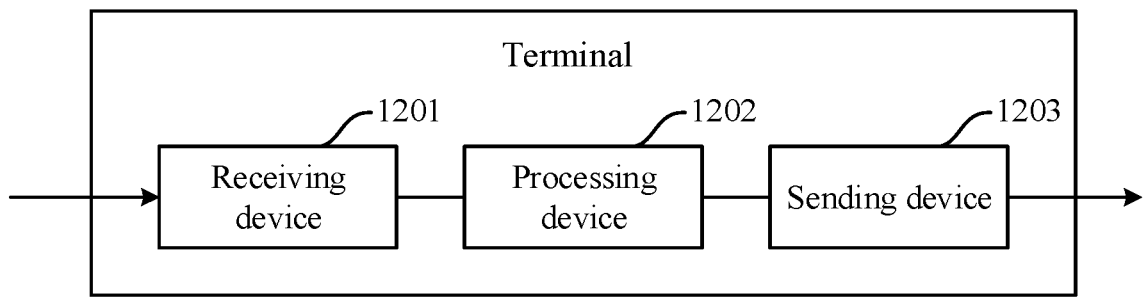
FIG. 12 is a schematic structural diagram of a terminal provided by an embodiment of the present application.

Referring to FIG. 12, FIG. 12 is a schematic structural diagram of a terminal provided by an embodiment of the present application. As shown in the figure, the terminal may include: a receiving device 1201 and a processing device 1202, and may further include a sending device 1203.

The receiving device 1201 is used for receiving a first paging message from a first radio access network corresponding to a first sub PDU session, where the first paging message carries association indication information or an association sequence number, and the association indication information or the association sequence number is used for indicating that the terminal has a second paging message carrying the same association indication information or the same association sequence number.

The processing device 1202 is used for responding to the first paging message and ignoring the second paging message; or, responding to the second paging message and ignoring the first paging message.

In one embodiment, the processing device 1202 is specifically used for sending, by the sending device 1203, a service request message to the AMF entity. The receiving device 1201 is further used for: receiving a reject message sent by the AMF entity, where the reject message is used for instructing the terminal to initiate a service request process in a second access network corresponding to a second sub PDU session associated with the first sub PDU session; and the processing device 1202 is specifically used for initiating the service request process through the second access network corresponding to the second PDU session according to the reject message.

In the apparatus shown in FIG. 12 above, the description is made by taking the activation of one of the mutually associated sub PDU sessions as an example. The above implementation principle is also applicable to the process of activating any or specified one of at least two user plane connections of one multi-access PDU session. On the basis of the apparatus shown in FIG. 12 above, the mutually associated sub PDU sessions are replaced with at least two user plane connections of one multi-access PDU session, and then on the basis of the apparatus shown in FIG. 12 above, it is possible to obtain an apparatus for activating any or specified one of the at least two user plane connections of one multi-access PDU session.

An embodiment of the present application further provides a communication apparatus, which may be an SMF entity apparatus, and can implement the functions implemented on the SMF entity side in the embodiments of the present application.

Figure 13:
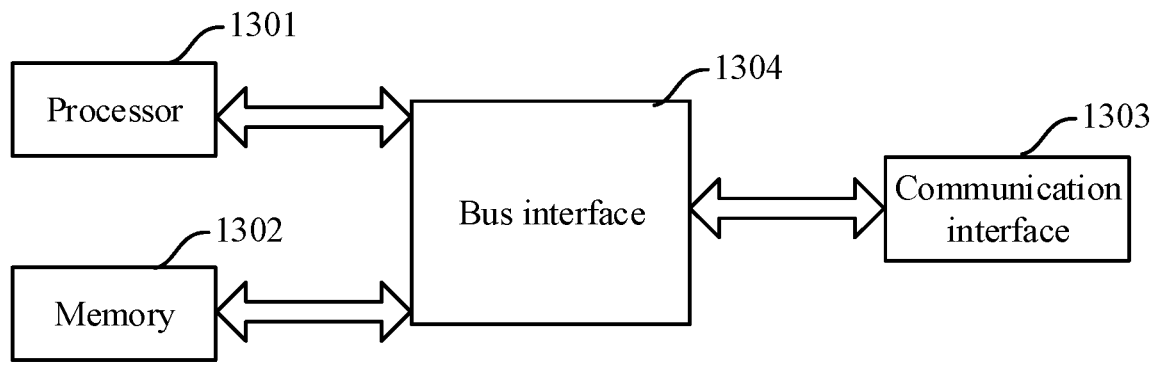
FIG. 13 is a schematic structural diagram of a communication apparatus provided by an embodiment of the present application.

Referring to FIG. 13, FIG. 13 is a schematic structural diagram of a communication apparatus provided by an embodiment of the present application. As shown in the figure, the communication apparatus may include: a processor 1301, a memory 1302, a communication interface 1303 and a bus interface 1304.

The processor 1301 is responsible for managing bus architecture and general processing, and the memory 1302 may store data used by the processor 1301 when performing an operation. The communication interface 1303 is used for receiving and sending data under the control of the processor 1301.

The bus architecture may include any number of interconnected buses and bridges, which are specifically linked together by various circuits of one or more processors represented by the processor 1301 and memories represented by the memory 1302. The bus architecture can also link various other circuits such as peripheral devices, voltage regulators and power management circuits, which are well known in the art. Therefore, further description is omitted herein. The bus interface provides an interface. The processor 1301 is responsible for managing bus architecture and general processing, and the memory 1302 may store data used by the processor 1301 when performing an operation.

The process disclosed in the embodiments of the present application may be applied to the processor 1301 or implemented by the processor 1301. In the implementation process, each step of the signal processing flow may be completed by an integrated logic circuit of hardware in the processor 1301 or an instruction in the form of software. The processor 1301 may be a general-purpose processor, a digital signal processor, an application specific integrated circuit, a field programmable gate array or other programmable logic devices, a discrete gate or transistor logic device, or a discrete hardware component, and may implement or execute the methods, steps, and logical block diagrams disclosed in the embodiments of the present application. The general-purpose processor may be a microprocessor or any conventional processor, etc. The steps of the method disclosed in conjunction with the embodiments of the present application may be directly embodied to be executed by a hardware processor, or may be executed by a combination of hardware and software devices in the processor. The software device may be located in a mature storage medium in the art, such as a random access memory, a flash memory, a read-only memory, a programmable read-only memory, an electrically erasable programmable memory, and a register. The storage medium is located in the memory 1302, and the processor 1301 reads information in the memory 1302 and completes the steps of the signal processing flow in combination with its hardware.

Specifically, the processor 1301 is used for reading a computer instruction in the memory 1302 and executing the functions implemented on the SMF entity side in the processes shown in FIG. 4 and FIG. 6 to FIG. 9.

In the apparatus shown in FIG. 13 above, the description is made by taking the activation of one of the mutually associated sub PDU sessions as an example. The above implementation principle is also applicable to the process of activating any or specified one of at least two user plane connections of one multi-access PDU session. On the basis of the apparatus shown in FIG. 13 above, the mutually associated sub PDU sessions are replaced with at least two user plane connections of one multi-access PDU session, and then on the basis of the apparatus shown in FIG. 13 above, it is possible to obtain the apparatus for activating any or specified one of the at least two user plane connections of one multi-access PDU session.

An embodiment of the present application further provides a communication apparatus, which may be an AMF entity apparatus, and can implement the functions implemented on the AMF entity side in the embodiments of the present application.

Figure 14:
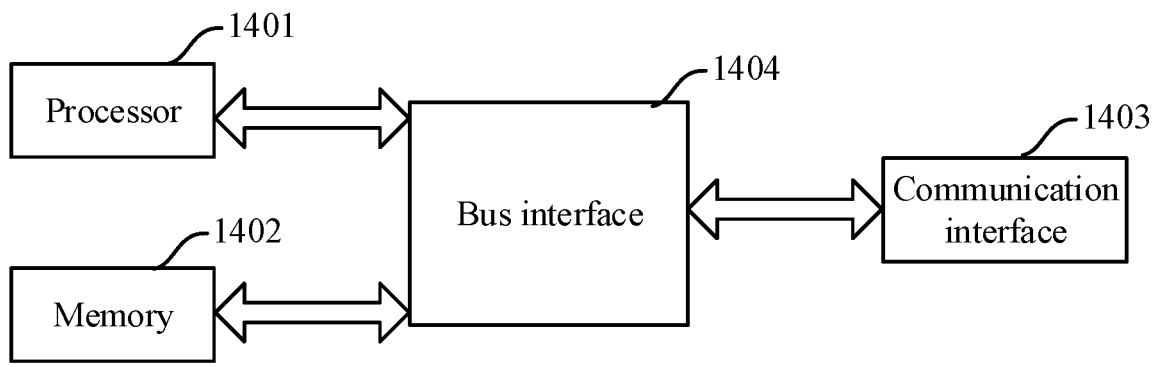
FIG. 14 is a schematic structural diagram of a communication apparatus provided by another embodiment of the present application.

Referring to FIG. 14, FIG. 14 is a schematic structural diagram of a communication apparatus provided by an embodiment of the present application. As shown in the figure, the communication apparatus may include: a processor 1401, a memory 1402, a communication interface 1403 and a bus interface 1404.

The processor 1401 is responsible for managing bus architecture and general processing, and the memory 1402 may store data used by the processor 1401 when performing an operation. The communication interface 1403 is used for receiving and sending data under the control of the processor 1401.

The bus architecture may include any number of interconnected buses and bridges, which are specifically linked together by various circuits of one or more processors represented by the processor 1401 and memories represented by the memory 1402. The bus architecture can also link various other circuits such as peripheral devices, voltage regulators and power management circuits, which are well known in the art. Therefore, further description is omitted herein. The bus interface provides an interface. The processor 1401 is responsible for managing bus architecture and general processing, and the memory 1402 may store data used by the processor 1401 when performing an operation.

The process disclosed in the embodiments of the present application may be applied to the processor 1401 or implemented by the processor 1401. In the implementation process, each step of the signal processing flow may be completed by an integrated logic circuit of hardware in the processor 1401 or an instruction in the form of software. The processor 1401 may be a general-purpose processor, a digital signal processor, an application specific integrated circuit, a field programmable gate array or other programmable logic devices, a discrete gate or transistor logic device, or a discrete hardware component, and may implement or execute the methods, steps, and logical block diagrams disclosed in the embodiments of the present application. The general-purpose processor may be a microprocessor or any conventional processor, etc. The steps of the method disclosed in conjunction with the embodiments of the present application may be directly embodied to be executed by a hardware processor, or may be executed by a combination of hardware and software devices in the processor. The software device may be located in a mature storage medium in the art, such as a random access memory, a flash memory, a read-only memory, a programmable read-only memory, an electrically erasable programmable memory, and a register. The storage medium is located in the memory 1402, and the processor 1401 reads information in the memory 1402 and completes the steps of the signal processing flow in combination with its hardware.

Specifically, the processor 1401 is used for reading a computer instruction in the memory 1402 and executing the functions implemented on the AMF entity side in the processes shown in FIG. 5 and FIG. 6 to FIG. 9.

In the apparatus shown in FIG. 14 above, the description is made by taking the activation of one of the mutually associated sub PDU sessions as an example. The above implementation principle is also applicable to the process of activating any or specified one of at least two user plane connections of one multi-access PDU session. On the basis of the apparatus shown in FIG. 14 above, the mutually associated sub PDU sessions are replaced with at least two user plane connections of one multi-access PDU session, and then on the basis of the apparatus shown in FIG. 14 above, it is possible to obtain an apparatus for activating any or specified one of the at least two user plane connections of one multi-access PDU session.

An embodiment of the present application further provides a communication apparatus, which may be a terminal, and can implement the functions implemented on the terminal side in the embodiments of the present application.

Figure 15:
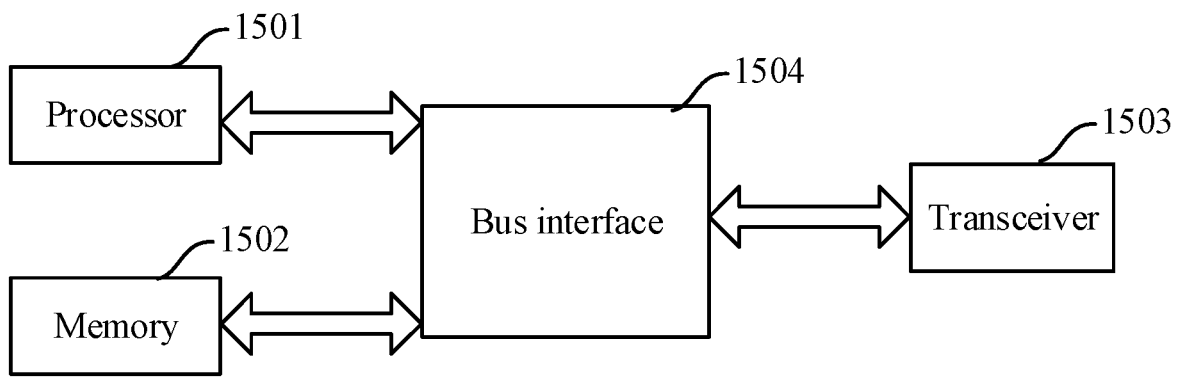
FIG. 15 is a schematic structural diagram of a communication apparatus provided by still another embodiment of the present application.

Referring to FIG. 15, FIG. 15 is a schematic structural diagram of a communication apparatus provided by an embodiment of the present application. As shown in the figure, the communication apparatus may include: a processor 1501, a memory 1502, a transceiver 1503 and a bus interface 1504.

The processor 1501 is responsible for managing bus architecture and general processing, and the memory 1502 may store data used by the processor 1501 when performing an operation. The transceiver 1503 is used for receiving and sending data under the control of the processor 901.

The bus architecture may include any number of interconnected buses and bridges, which are specifically linked together by various circuits of one or more processors represented by the processor 1501 and memories represented by the memory 1502. The bus architecture can also link various other circuits such as peripheral devices, voltage regulators and power management circuits, which are well known in the art. Therefore, further description is omitted herein. The bus interface provides an interface. The processor 1501 is responsible for managing bus architecture and general processing, and the memory 1502 may store data used by the processor 1501 when performing an operation.

The process disclosed in the embodiments of the present application may be applied to the processor 1501 or implemented by the processor 1501. In the implementation process, each step of the signal processing flow may be completed by an integrated logic circuit of hardware in the processor 1501 or an instruction in the form of software. The processor 1501 may be a general-purpose processor, a digital signal processor, an application specific integrated circuit, a field programmable gate array or other programmable logic devices, a discrete gate or transistor logic device, or a discrete hardware component, and may implement or execute the methods, steps, and logical block diagrams disclosed in the embodiments of the present application. The general-purpose processor may be a microprocessor or any conventional processor, etc. The steps of the method disclosed in conjunction with the embodiments of the present application may be directly embodied to be executed by a hardware processor, or may be executed by a combination of hardware and software devices in the processor. The software device may be located in a mature storage medium in the art, such as a random access memory, a flash memory, a read-only memory, a programmable read-only memory, an electrically erasable programmable memory, and a register. The storage medium is located in the memory 1502, and the processor 1501 reads information in the memory 1502 and completes the steps of the signal processing flow in combination with its hardware.

Specifically, the processor 1501 is used for reading a computer instruction in the memory 1502 and executing the functions implemented on the terminal side in the processes shown in FIG. 6 to FIG. 9.

In the apparatus shown in FIG. 15 above, the description is made by taking the activation of one of the mutually associated sub PDU sessions as an example. The above implementation principle is also applicable to the process of activating any or specified one of at least two user plane connections of one multi-access PDU session. On the basis of the apparatus shown in FIG. 15 above, the mutually associated sub PDU sessions are replaced with at least two user plane connections of one multi-access PDU session, and then on the basis of the apparatus shown in FIG. 15 above, it is possible to obtain an apparatus for activating any or specified one of the at least two user plane connections of one multi-access PDU session.

An embodiment of the present application further provides a computer-readable storage medium. The computer-readable storage medium stores a computer-executable instruction, and the computer-executable instruction is used for causing a computer to execute the process executed by the SMF entity in the foregoing embodiment.

An embodiment of the present application further provides a computer-readable storage medium. The computer-readable storage medium stores a computer-executable instruction, and the computer-executable instruction is used for causing a computer to execute the process executed by the AMF entity in the foregoing embodiments.

An embodiment of the present application further provides a computer-readable storage medium. The computer-readable storage medium stores a computer-executable instruction, and the computer-executable instruction is used for causing a computer to execute the process executed by the terminal in the foregoing embodiments.

The embodiments of the present application can provide methods, systems and computer program products. Thus, the present application can adopt the form of hardware embodiments alone, software embodiments alone, or embodiments combining the software and hardware aspects. In addition, the present application can adopt the form of computer program products implemented on one or more computer usable storage mediums (including but not limited to magnetic disk memories, CD-ROMs, optical memories and the like) containing computer usable program codes therein.

The present application is described with reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions may be provided to a processor of a general-purpose computer, a special-purpose computer, an embedded processor, or other programmable data processing devices to produce a machine, and the instructions executed by the processor of a computer or other programmable data processing devices generate an apparatus for implementing the functions specified in one or more processes in flowcharts and/or one or more blocks in block diagrams.

These computer program instructions may also be stored in a computer-readable memory directs a computer or other programmable data processing device to work in a particular manner and the instructions stored in the computer-readable memory produce a manufactured article including the instruction device, where the instruction device implements the functions specified in one or more processes in flow charts and/or one or more blocks in block diagrams.

These computer program instructions can also be loaded onto a computer or other programmable data processing devices, so that a series of steps can be performed on the computer or other programmable devices to produce computer-implemented processing. Thus, the instructions executed on a computer or other programmable devices provide steps for implementing the functions specified in one or more processes in flow charts and/or one or more blocks in block diagrams.

What is claimed is:

1. A protocol data unit (PDU) session activation method, comprising:
   receiving, by a session management function (SMF) entity, a downlink data notification message;
   determining, by the SMF entity, that a PDU session for transmitting the downlink data is a multi-access PDU session, and then determining at least one access and mobility management function (AMF) entity corresponding to the multi-access PDU session; and
   sending, by the SMF entity, a message configured to activate the PDU session to the at least one AMF entity, wherein the message configured to activate the PDU session carries at least a PDU session identifier of the multi-access PDU session, and the message configured to activate the PDU session is used for enabling the at least one AMF entity to activate any one or specific one of at least two user plane connections of the multi-access PDU session corresponding to the PDU session identifier.

2. The method according to claim 1, wherein the sending, by the SMF entity, the message configured to activate the PDU session to the at least one AMF entity, wherein the message configured to activate the PDU session carries at least the PDU session identifier of the multi-access PDU session, comprises:
   determining, by the SMF entity, to activate the any one of the at least two user plane connections of the multi-access PDU session, and then for each of the at least two user plane connections, sending the message configured to activate the PDU session to the at least one AMF entity, wherein each message configured to activate the PDU session carries the PDU session identifier of the multi-access PDU session, association indication information and access type indication information, the access type indication information indicates a radio access network corresponding to the each of the at least two user plane connections, and the association indication information indicates activation of the any one of the at least two user plane connections.

3. The method according to claim 2, wherein for the each of the at least two user plane connections, by the SMF entity, sending the message configured to activate the PDU session to the at least one AMF entity, comprises:
   determining, by the SMF entity, that the multi-access PDU session corresponds to a same AMF entity, and then sending the message configured to activate the PDU session to the same AMF entity respectively; or,
   determining, by the SMF entity, that the multi-access PDU session corresponds to at least two different AMF entities, and then sending the message configured to activate the PDU session to the at least two different AMF entities respectively.

4. The method according to claim 1, wherein sending, by the SMF entity, the message configured to activate the PDU session to the at least one AMF entity, wherein the message configured to activate the PDU session carries at least the PDU session identifier of the multi-access PDU session, comprises:
   determining, by the SMF entity, that the multi-access PDU session corresponds to a same AMF entity, and determining to activate the any one of the at least two user plane connections of the multi-access PDU session, and then sending the message configured to activate the PDU session to the same AMF entity, wherein the message configured to activate the PDU session carries the PDU session identifier of the multi-access PDU session.

5. The method according to claim 1, wherein sending, by the SMF entity, the message configured to activate the PDU session to the at least one AMF entity, wherein the message configured to activate the PDU session carries at least the PDU session identifier of the multi-access PDU session, comprises:
   determining, by the SMF entity, that the multi-access PDU session corresponds to a same AMF entity, determining to activate a specific user plane connection of the at least two user plane connections of the multi-access PDU session, and then sending the message configured to activate the PDU session to the same AMF entity, wherein the message configured to activate the PDU session carries the PDU session identifier of the multi-access PDU session, and access type indication information of a radio access network corresponding to the specific user plane connection; or,
   determining, by the SMF entity, that the multi-access PDU session corresponds to at least two different AMF entities, determining to activate a specific user plane connection of the at least two user plane connections of the multi-access PDU session, then determining an AMF entity corresponding to the specified user plane connection, sending the message configured to activate the PDU session to an AMF entity corresponding to the specific user plane connection, wherein the message configured to activate the PDU session carries the PDU session identifier of the multi-access PDU session.

6. The method according to claim 2, wherein the message configured to activate the PDU session further carries uplink tunnel information of the corresponding user plane connection.

7. The method according to claim 1, further comprising:
   receiving, by the SMF entity, a session update request message sent by the at least one AMF entity, wherein the session update request message carries radio access type indication information; and
   activating, by the SMF entity, a user plane connection corresponding to the radio access type indication information in the at least two user plane connections of the multi-access PDU session according to the session update request message, to enable the downlink data to be transmitted through the multi-access PDU session.

8. A PDU session activation method, comprising:
   receiving, by an AMF entity, a message configured to activate the PDU session from an SMF entity, wherein the message configured to activate the PDU session carries at least a PDU session identifier of a multi-access PDU session;
   activating, by the AMF entity, any one or specific one of at least two user plane connections of the multi-access PDU session according to the message configured to activate the PDU session; and
   activating, by the AMF entity, a user plane connection corresponding to the radio access type indication information in the at least two user plane connections of the multi-access PDU session according to the session update request message, to enable the downlink data to be transmitted through the multi-access PDU session.

9. The method according to claim 8, wherein the message configured to activate the PDU session further carries association indication information and access type indication information, and the association indication information indicates activation of the any one of the at least two user plane connections of the multi-access PDU session; and activating, by the AMF entity, the any one of the at least two user plane connections of the multi-access PDU session according to the message configured to activate the PDU session, comprises:

determining, by the AMF entity, that a terminal corresponding to the multi-access PDU session is in a connected state in a radio access network corresponding to the access type indication information, and then activating, in the radio access network corresponding to the access type indication information, a user plane connection in the radio access network in the at least two user plane connections of the multi-access PDU session.

10. The method according to claim 9, wherein the message configured to activate the PDU session further carries association indication information and access type indication information, and the association indication information indicates activation of the any one of the at least two user plane connections of the multi-access PDU session; and the method further comprises: determining, by the AMF entity, that a terminal corresponding to the multi-access PDU session is in an idle state in radio access networks associated with the at least two user plane connections of the multi-access PDU session, and then sending a paging request message to an RAN node in the radio access network corresponding to the access type indication information, wherein the paging request message carries the association indication information or an association sequence number generated by the AMF entity.

11. The method according to claim 10, further comprising:

determining, by the AMF entity, whether to page the terminal in the radio access networks;

in a case that the AMF entity determines to page the terminal in the radio access networks, after receiving the message configured to activate the PDU session from the SMF entity, immediately sending the paging request message; and in a case that the AMF entity determines not to page the terminal in the radio access networks, determining whether the received message configured to activate the PDU session is a first message configured to activate the PDU session carrying a same PDU session identifier, in a case that the received message configured to activate the PDU session is the first message configured to activate the PDU session carrying the same PDU session identifier, immediately sending the paging request message, and in a case that the received message configured to activate the PDU session is not the first message configured to activate the PDU session carrying the same PDU session identifier, after waiting for failure of paging the terminal in other radio access networks, sending the paging request message to the RAN node in the radio access network corresponding to the access type indication information.

12. The method according to claim 9, wherein activating, by the AMF entity, according to the message configured to activate the PDU session, the any or specific one of the at least two user plane connections of the multi-access PDU session, comprises:

determining, by the AMF entity, that the terminal corresponding to the multi-access PDU session is in a connected state in a first radio access network, and then activating, in the first radio access network, a user plane connection in the first radio access network in the at least two user plane connections of the multi-access PDU session, wherein the first radio access network is any one of at least two radio access networks corresponding to the at least two user plane connections of the multi-access PDU session.

13. The method according to claim 9, wherein activating, by the AMF entity, according to the message configured to activate the PDU session, the any or specific one of the at least two user plane connections of the multi-access PDU session, comprises:

determining, by the AMF entity, that the terminal corresponding to the multi-access PDU session is in an idle state in radio access networks corresponding to the at least two user plane connections of the multi-access PDU session, and then determining whether to page the terminal in the radio access networks;

in a case that the AMF entity determines to page the terminal in the radio access networks, respectively sending a paging request message to RAN nodes in the radio access networks associated with the at least two user plane connections of the multi-access PDU session; and in a case that the AMF entity determines not to page the terminal in the radio access networks, determining whether the received message configured to activate the PDU session is a first message configured to activate the PDU session carrying a same PDU session identifier, in a case that the received message configured to activate the PDU session is the first message configured to activate the PDU session carrying the same PDU session identifier, sending the paging request message to an RAN node in a first radio access network, and in a case that the received message configured to activate the PDU session is not the first message configured to activate the PDU session carrying the same PDU session identifier, after waiting for failure of paging the terminal in the radio access network where the RAN node in the first radio access network is located, sending a paging request message to an RAN node in a second radio access network, wherein the RAN node in the first radio access network and the RAN node in the second radio access network are different RAN nodes among the RAN nodes in the radio access networks associated with the at least two user plane connections of the multi-access PDU session.

14. The method according to claim 9, wherein radio access networks associated with the at least two user plane connections of the multi-access PDU session comprise a first radio access network and a second radio access network, the message configured to activate the PDU session further carries access type indication information, and the access type indication information corresponds to the first radio access network; and activating, by the AMF entity, according to the message configured to activate the PDU session, a specific user plane connection of the at least two user plane connections of the multi-access PDU session, comprises:

determining, by the AMF entity, that the terminal corresponding to the multi-access PDU session is in a connected state in the first radio access network corresponding to the access type indication information, and then activating, in the first radio access network, a user plane connection corresponding to the first radio access network in the at least two user plane connections of the multi-access PDU session corresponding to the PDU session identifier; or, determining, by the AMF entity, that the terminal corresponding to the multi-access PDU session is in a connected state in the second radio access network, and then sending a notification message to an RAN node in the second access network, wherein the notification message is used for notifying the terminal of activating, in the first radio access network, a user plane connection corresponding to the first radio access network in the at least two user plane connections of the multi-access PDU session corresponding to the PDU session identifier; or, determining, by the AMF entity, that the terminal corresponding to the multi-access PDU session is in an idle state in the second radio access network, then sending a paging request message to an RAN node in the second radio access network, and sending a reject message to the terminal after receiving a service request message sent by the terminal, wherein the reject message is used for instructing the terminal to initiate a service request process in the first access network.

15. An SMF entity apparatus, comprising: a memory and at least one processor, wherein the at least one processor is configured to read and execute instructions stored in the memory to perform the method of claim 1.

16. An AMF entity apparatus, comprising: a memory and at least one processor, wherein the at least one processor is configured to read and execute instructions stored in the memory to perform the method of claim 8.

* * * * *